(12) United States Patent
Whiteford et al.

(10) Patent No.: US 10,752,370 B2
(45) Date of Patent: Aug. 25, 2020

(54) AIRCRAFT ENGINE MOUNT

(71) Applicant: LORD Corporation, Cary, NC (US)

(72) Inventors: Gerald P. Whiteford, Waterford, PA (US); Kirk W. Olsen, Erie, PA (US); Jason Gregory, Girard, PA (US); James A. Maciak, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 16/429,218

(22) Filed: Jun. 3, 2019

(65) Prior Publication Data

US 2019/0352013 A1 Nov. 21, 2019

Related U.S. Application Data

(62) Division of application No. 15/533,196, filed as application No. PCT/US2016/012480 on Jan. 7, 2016, now Pat. No. 10,464,685.

(60) Provisional application No. 62/100,672, filed on Jan. 7, 2015.

(51) Int. Cl.
*B64D 27/26* (2006.01)

(52) U.S. Cl.
CPC ........ *B64D 27/26* (2013.01); *B64D 2027/262* (2013.01); *B64D 2027/266* (2013.01); *B64D 2027/268* (2013.01)

(58) Field of Classification Search
CPC .............. B64D 27/26; B64D 2027/262; B64D 2027/266
USPC ....................................................... 244/54
See application file for complete search history.

(56) References Cited

U.S. PATENT DOCUMENTS

| | | | |
|---|---|---|---|
| 3,662,462 A | 5/1972 | Shifflet | |
| 4,055,369 A | 10/1977 | Lynn et al. | |
| 4,219,246 A | 8/1980 | Ladin | |
| 4,276,974 A | 7/1981 | Ladin | |
| 4,318,212 A | 3/1982 | Schnabel | |
| 5,277,382 A | 1/1994 | Seelen et al. | |
| 5,303,880 A * | 4/1994 | Cencula ................. | B64D 27/26 244/54 |
| 5,351,930 A * | 10/1994 | Gwinn .................... | B64D 27/26 244/54 |
| 5,649,417 A | 7/1997 | Hey | |
| 5,860,623 A * | 1/1999 | Dunstan ................. | B64D 27/18 244/54 |
| 6,059,227 A * | 5/2000 | Le Blaye ............... | B64D 27/26 244/54 |
| 6,330,995 B1 | 12/2001 | Mangeiga et al. | |

(Continued)

FOREIGN PATENT DOCUMENTS

| | | | |
|---|---|---|---|
| CA | 1 162 394 | 2/1984 | |
| EP | 1129942 A2 * | 9/2001 | ............. B64D 27/26 |

OTHER PUBLICATIONS

Armstrong, K.P., Bearing staking process investigation using a designed experiment. United States: N.p., 1990. Web. doi:10.2172/6301011.

*Primary Examiner* — Christopher P Ellis

(57) ABSTRACT

An engine mount system having failsafe securement points. The engine mount system includes a forward mount carrying a coat hanger shackle having a spherical bearing and a cylindrical bearing. Securement of the engine mount to a support utilizes pins and bolts with a retaining double wrench washer incorporated into the final mounting structure. The engine mount system additionally includes an aft mount.

2 Claims, 20 Drawing Sheets

(56) References Cited

U.S. PATENT DOCUMENTS

| | | |
|---|---|---|
| 6,349,470 B1 | 2/2002 | Sasaki et al. |
| 6,408,519 B1 | 6/2002 | Beyfuss et al. |
| 6,666,583 B2 | 12/2003 | Nieman et al. |
| 6,843,449 B1 | 1/2005 | Manteiga et al. |
| 6,988,692 B2 * | 1/2006 | Pasquer ............... B64D 27/26 244/54 |
| 7,093,996 B2 | 8/2006 | Wallace et al. |
| 7,325,770 B2 | 2/2008 | Chevalier et al. |
| 8,028,414 B2 | 10/2011 | Gratton |
| 8,152,094 B2 | 4/2012 | Foster |
| 8,181,908 B2 | 5/2012 | Mauran et al. |
| 8,726,667 B2 | 5/2014 | Tanner et al. |
| 8,740,136 B2 | 6/2014 | Audart-Noel et al. |
| 9,033,297 B2 * | 5/2015 | Vignali ............... F04D 29/601 248/309.1 |
| 2002/0095790 A1 | 7/2002 | Sasaki et al. |
| 2005/0047696 A1 | 3/2005 | Serrels et al. |
| 2006/0219841 A1 * | 10/2006 | Dron .................. B64D 27/26 244/54 |
| 2007/0223849 A1 | 9/2007 | Tschopp et al. |
| 2008/0169378 A1 | 7/2008 | Beaufort et al. |
| 2008/0230675 A1 | 9/2008 | Audart-Noel et al. |
| 2013/0017082 A1 | 1/2013 | Casavant |
| 2013/0042630 A1 | 2/2013 | Muldoon |
| 2014/0033729 A1 * | 2/2014 | Chouard ............... F02C 7/20 60/772 |
| 2014/0042268 A1 * | 2/2014 | Sandy .................. F16B 39/26 244/54 |
| 2014/0183298 A1 * | 7/2014 | Brochard ............. B64D 27/26 244/54 |
| 2015/0013142 A1 * | 1/2015 | West .................. B64D 27/26 29/525.08 |
| 2015/0122943 A1 * | 5/2015 | Wu ..................... B64D 27/18 244/54 |
| 2015/0166188 A1 * | 6/2015 | Lin .................... B64D 27/26 244/54 |
| 2016/0122029 A1 * | 5/2016 | Serra .................. B64D 27/26 244/54 |
| 2016/0290391 A1 * | 10/2016 | Hill .................. F16C 11/045 |
| 2019/0055025 A1 * | 2/2019 | Gruner ................. F16C 33/22 |
| 2019/0106203 A1 * | 4/2019 | Bennett .............. B64C 27/001 |
| 2019/0144124 A1 * | 5/2019 | Zameroski .......... B64C 27/001 267/140.11 |
| 2019/0168861 A1 * | 6/2019 | Fotouhie ............. B64C 15/12 |

* cited by examiner

AIRCRAFT ENGINE MOUNT

CROSS-REFERENCE TO RELATED APPLICATIONS

The present application claims the benefit of U.S. Provisional Patent Application Ser. No. 62/100,672, filed Jan. 7, 2015, the disclosure of which is incorporated herein by reference in its entirety.

BACKGROUND

Aircraft engine mounts require failsafe mounts. Typically, forward and aft mounts will secure a jet engine, also known as a turbofan, turbojet and by other terms, to a pylon or other structural component on the aircraft. Each mount includes a plurality of securement points with at least one additional failsafe point. The failsafe enables safe operation of the aircraft in the event of a failure at one of the other securement points. In addition to the primary task of safely securing the engine to the airframe, the forward and aft mounts must be readily accessible to permit efficient installation, removal and servicing of the engine.

SUMMARY

This disclosure describes an engine mounting system comprising a forward engine mount carrying a forward shackle assembly. The forward shackle assembly includes a coat hanger bracket, a center bearing, a cylindrical bearing and a spherical bearing. A pin passes through each bearing and a bolt having a head sized to pass through the bearing is positioned within the pin. A double wrench washer tool is incorporated into the mounting system when the forward shackle assembly is secured to a pair a clevis points.

Additionally, this disclosure describes an engine mount system suitable for mounting a turbofan engine to a pylon attached to an aircraft wing. The mount system includes an aft mounting reacting vertical, lateral and rear loads and a forward mount reacting thrust, vertical and lateral loads. The system attaches to the aircraft engine at 4 points at the forward mount and two points at the rear mount. Further, the forward and aft mounts include an additional fail-safe attachment to the engine. The fail-safe attachment associated with each mount only engages under select failure conditions. The Fail-safe features included at both the aft and forward mount provide full fail-safe load paths. The system remains statically determinant under all loading conditions in both the all components intact and under single component failure configurations.

Further, this disclosure describes an engine mounting system that permits a known distribution of loads under all conditions with component loads being independent of the engine, engine mount, and pylon stiffness. The mount system provides fail-safe features for safety. The system also accommodates installation tolerances and differential thermal expansion between the engine and mount system components without the introduction of internal mount system stresses.

Disclosed herein is an engine mounting system. The engine mounting system includes a forward engine mount. The forward mount carries a forward shackle assembly. The forward shackle assembly includes a coat hanger bracket, a center bearing positioned within a first hole passing through said coat hanger bracket, a cylindrical bearing positioned within a second hole passing through said coat hanger bracket and a spherical bearing within a third hole passing through said coat hanger bracket. A first pin housing a first bolt passes through said cylindrical bearing. A second pin housing a second bolt passes through said spherical bearing. Each bolt has a bolt head sized to permit passage through the respective bearing but not through the respective pin.

Also disclosed herein is an engine mounting system comprising an engine, a forward engine mount, first and second clevis points on the engine each clevis point having a pair of lugs and a set of nested bushings positioned within each lug of each clevis point. The forward engine mount includes a main fitting carrying a forward shackle assembly. The forward shackle assembly includes a coat hanger bracket, a center bearing positioned within a first hole passing through the coat hanger bracket, a cylindrical bearing positioned within a second hole passing through the coat hanger bracket and a spherical bearing within a third hole passing through the coat hanger bracket. The clevis points are configured to be secured to the cylindrical bearing and the spherical bearing carried by the coat hanger bracket. A first pin passes through the cylindrical bearing and the nested bushings within the first clevis point. A second pin passes through the spherical bearing and the nested bushing within the second clevis point. A first bolt passes through the first pin. The first bolt has a threaded end and a bolt head sized to permit passage of the bolt head through the cylindrical bearing but not through the first pin wherein the bolt head projects outward from the first clevis point. A first securement device is positioned on the first bolt opposite of the bolt head. A second bolt passes through the second pin, the second bolt has a threaded end and a bolt head sized to permit passage of the bolt head through the spherical bearing but not through the second pin wherein the bolt head projects outward from the second clevis point. A second securement device is positioned on the second bolt opposite of the bolt head. A wrench washer tool positioned between the first bolt head and the nested bushing within the first clevis point and between the second bolt head and the nested bushing within the second clevis point.

Still further, disclosed herein is a bearing assembly. The bearing assembly includes a pair of lugs, a pair of nested bushings positioned within each lug, each nested bushing having an inner-flanged bushing and an outer-flanged bushing, the inner-flanged bushing extending beyond the lug, a bearing positioned between the lugs such that the bearing is adjacent to the flanges of each nested bushing and a pin having a first end and a second end passing through the bearing. The second end of each pin optionally carries a flange. The flange carried by the pin engages the inner flanged bushing located within the lug adjacent to the second end of the pin. In place of the optional flange may be a washer or spacer having a diameter sufficient to engage the inner- and outer-flanged bushings. A bolt positioned within the pin. The bolt has a threaded end protruding from the second end of the pin carrying the flange and a bolt head adjacent the first end of the bolt, the bolt head sized to preclude passage of the bolt head through the pin. A nut positioned on the threaded end of the bolt. When a washer is substitute for the flange, the washer will be placed on the threaded end of the bolt prior positioning the nut on the threaded end of the bolt. Additionally, a washer is positioned between the bolt head and the pin. The washer engages the inner-flanged bushing located within the lug adjacent the bolt head. Upon application of torque to the bolt head and the nut, the inner-flanged bushings located within each lug are compressed against the bearing thereby precluding application of force laterally against the lugs.

Additionally, disclosed herein is an engine mounting system comprising an aft engine mount. The aft mount carries a first engine mounting link, a second engine mounting link and a failsafe link. The aft mount includes a center split pylon having two halves secured to one another. The pylon carries the first engine mounting link, the second engine mounting link and the failsafe link. The first engine mounting link carries three bearings positioned within the link, a first upper spherical bearing, a center oriented bearing and a lower spherical bearing. The first upper spherical bearing secures the first engine mounting link to the center split pylon and reacts forces in all vertical and horizontal directions. The second engine mounting link carries three bearings positioned within the link, a first upper spherical bearing, a center oriented bearing and a lower spherical bearing. The first upper spherical bearing secures the first engine mounting link to the center split pylon and reacts forces in all vertical and horizontal directions. The center oriented bearing of the first engine mounting link reacts forces only in a direction 90 degrees to the axis of the first engine mounting link and the center oriented bearing of the second engine mounting link reacts forces only in a direction 90 degrees to the axis of the second engine mounting link.

Still further, the present disclosure describes an engine mounting system comprising an aft engine mount carrying a first engine mounting link, a second engine mounting link and a failsafe link. The aft mount includes a center split pylon having two halves secured to one another. The pylon carries the first engine mounting link, the second engine mounting link and the failsafe link. Additionally, the pylon has at least one hole on its the upper surface. The hole is defined by a pair of opposing recesses in each half of the center split pylon. Located at the lower portion of the hole is a groove. Positioned within the hole is a shear pin. The shear pin carries a flange received within the groove located at the lower portion of said hole.

Additionally, disclosed herein is a method for staking an oriented bearing. The method comprises the steps of machining a chamfer on a surface within a bearing mounting opening; machining at least one divot within the chamfer; positioning a bearing race within the bearing mounting opening; staking the bearing race within the chamfer; and, forcing the bearing race to conform with the divot within the chamfer.

Also disclosed herein is a wrench washer tool. The wrench washer tool is particularly suited for torquing operations where bolt heads are blocked by additional components. The wrench washer tool comprises a first end and a second end. The first end has a first slot defined by parallel side walls. The first slot also carries flanges projecting inwardly from the parallel side walls. The second end of the wrench washer tool has a second slot defined by parallel side walls. The second slot also carries flanges projecting inwardly from the parallel side walls of the second slot. Additionally, the wrench washer tool carries torque application point projecting outwardly from the tool.

Further, disclosed herein is a bearing configured to react forces in a single plane. The bearing comprises a bearing race, two opposing bearing race interfaces and a cylindrical bearing inner member positioned within the bearing race. The cylindrical bearing inner member has two curved exterior walls and two parallel exterior walls. The curved exterior walls engage the bearing race interfaces and the parallel exterior walls define a gap between the cylindrical bearing inner member and the bearing race on each side of the cylindrical bearing inner member.

DETAILED DESCRIPTION

As used herein, the terms "left' and 'right" refer to airplane left and right.

Figure 1:
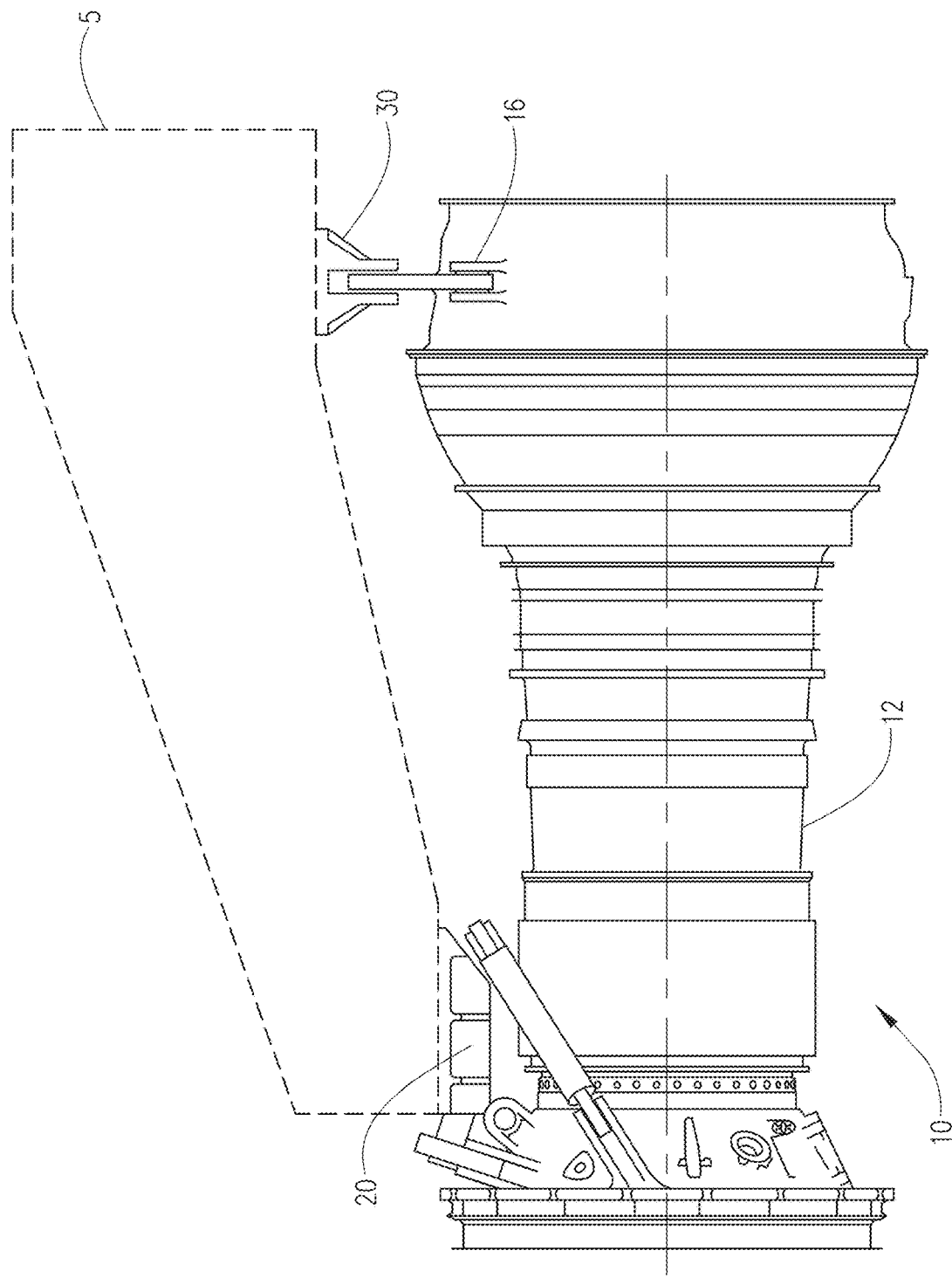
FIG. 1 depicts a side view of a turbine engine secured to a pylon by forward and aft mounts.

This disclosure describes an improved fail-safe engine mounting system 10 suitable for securing turbine engines to aircraft. As depicted in FIG. 1, system 10 includes a forward engine mount 20 and an aft engine mount 30 for securing a turbine engine 12 to a pylon 5 or other aircraft structure. The securement of engine 12 to pylon 5 via forward mount 20 and aft mount 30 is accomplished using multiple bolts 8 and shear pins 44. Additionally, this disclosure provides an improved bearing staking process suitable for retaining bearing races within any application that requires bearings positioned in a predetermined configuration and substantially precluding rotation of the bearing races.

Figure 4A:
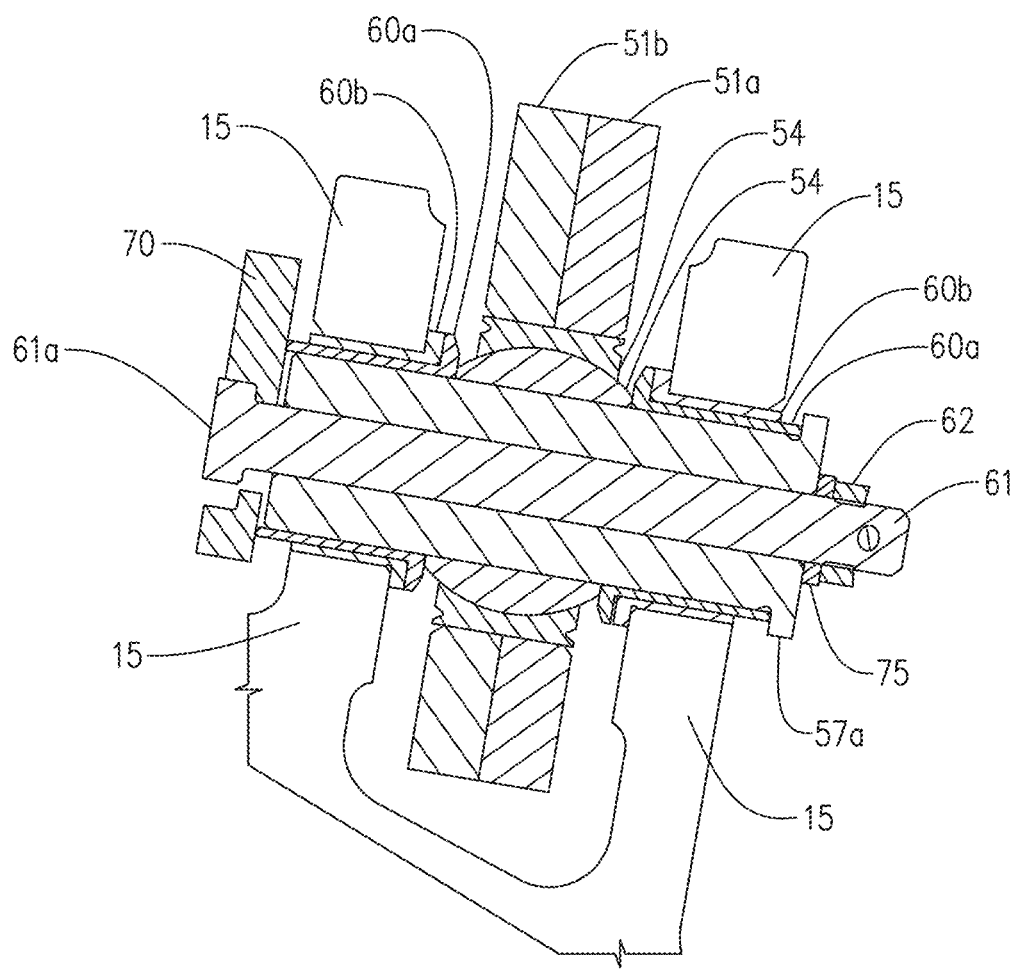
FIG. 4A is sectional view of a shackle assembly taken along lines A-A of FIG. 4B.

Engine 12 includes the necessary securement points for attachment of engine to engine mounting system 10. The forward portion of engine 12 includes forward mount front clevis mounting points 13a and 13b, right and left respectively and forward mount fail safe clevis mounting point 13c. The forward portion of engine 12 also includes two forward but lower clevis points 14a and 14b. Lower right clevis point 14a and lower left clevis point 14b are slightly to the aft of engine forward fail-safe clevis mounting point 13c. As depicted in FIG. 4A, each clevis mounting point 13a, 13b includes a pair of lugs 15 with each lug having a passageway 15a therethrough suitable for receiving bushings 60.

The forward engine mount 20 will be described with reference to FIGS. 2A-2F, 2H, and 3-10. The forward engine mount 20 includes a main fitting 40, a forward shackle assembly 50, a whipple tree assembly 80 with two thrust links 87 carried by the whipple tree 80. Main fitting 40 is a two-piece assembly split along the vertical thrust plane. Bolts 42 passing through main fitting right 40a and main fitting left 40b and retained by securing devices (not shown) secure each half to the other. Prior to assembly, two or more shear pins 44 having a lower lip or flange 44a are positioned within recesses 45 in each half 40a, 40b and are retained therein upon completion of assembly of main fitting right 40a to main fitting left 40b to one another. Each recess 45 having a groove 45a which cooperates with flange 44a of pin 44 to retain shear pin 44 within main fitting 40 after assembly thereof. Following assembly of main fitting right half 40a and main fitting left half 40b, recesses 45 define holes 45 along the centerline of main fitting 40. Thus, shear pins 44 are retained within holes 45 of main fitting 40 on the thrust line of forward engine mount 20.

Positioning of shear pins 44 along the centerline of main fitting 40 ensures application of thrust along the centerline 40c of mount 20 to pylon 5 without inducing any lateral moment. As assembled, one shear pin 44 is a tight fit having about 0.002 inches (about 0.051 millimeters) clearance between pin 44 and main fitting 40 and a second shear pin 44 has a slight clearance fit of about 0.01 inches (about 0.25 millimeters) clearance between pin 44 and main fitting 40. Thus, the second shear pin acts as a fail-safe.

In the assembled configuration, main fitting 40 has a forward projecting boss 46 and a rearward and downward projecting boss 47. Each boss will typically have a tapered decreasing diameter from the main fitting to the end of the boss; however, each boss may have a constant diameter cylinder configuration or any other convenient configuration. Additionally, each boss will have at least two threaded holes 48 with at least one hole 48 in each half of main fitting 40a and 40b. Further, in the assembled configuration, main fitting 40 has a fail-safe lug 49 position on the lower portion of main fitting 40.

The forward shackle assembly 50 includes a coat hanger bracket 51, a center bearing 52, a cylindrical bearing 53 and a spherical bearing 54. Positioned within cylindrical bearing 53 is a pin 58 with a bolt 61 installed within pin 58. Bolt head 61a is sized to preclude passage through pin 58; however, bolt head 61a and pin 58 together will pass through cylindrical bearing 53. Positioned within spherical bearing 54 is a pin 57 with a bolt 61 passing through pin 57. Bolt head 61a is sized to preclude passage through pin 57; however, bolt head 61a and pin 57 together will pass through spherical bearing 54. As discussed in more detail below, during assembly bolt 61 will be positioned within pin 57 or 58 and a castellated nut 62 secured to bolt 61. Bolt 61 and pin 57 or 58 will pass through the respective bearing 53 or 54. Wrench washer 70 will be positioned such that flanges 73 are located between bolt head 61a and pin 57 or 58. Thus, flanges 73 act as a retaining washer. Although described herein as pin 57 and pin 58, the same pin may be used with both bearing assemblies.

Coat hanger bracket 51 may be a single piece of metal, e.g. steel. However, to provide for the multiple redundancies required by the aviation industry, coat hanger bracket 51 typically includes at least two separate elements 51a and 51b split substantially along the mid-plane of coat hanger bracket 51. Typically, elements 51a and 51b are machined from stainless steel appropriate for the environment of use such as but not limited to 15-5PH stainless. Other suitable classes of metals appropriate for use would include: titanium alloys or high strength nickel alloys such as Inconel 718 and other alloys having the strength necessary for the targeted environment. In general, as is known to those skilled in the art, bearing size, steel hardness and other similar characteristics will be determined according to common engineering practices as dictated by the environment or field of use for the component.

Figure 7A:
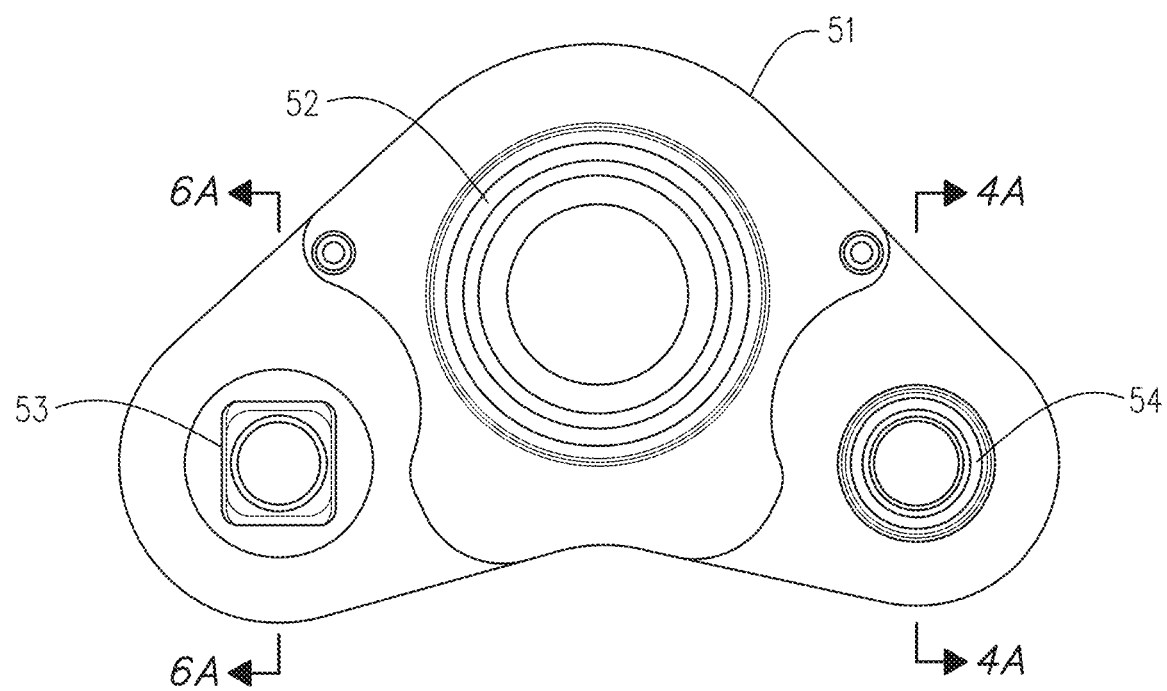
FIG. 7A is a front view of the forward shackle assembly of the front engine mount.
Figure 7B:
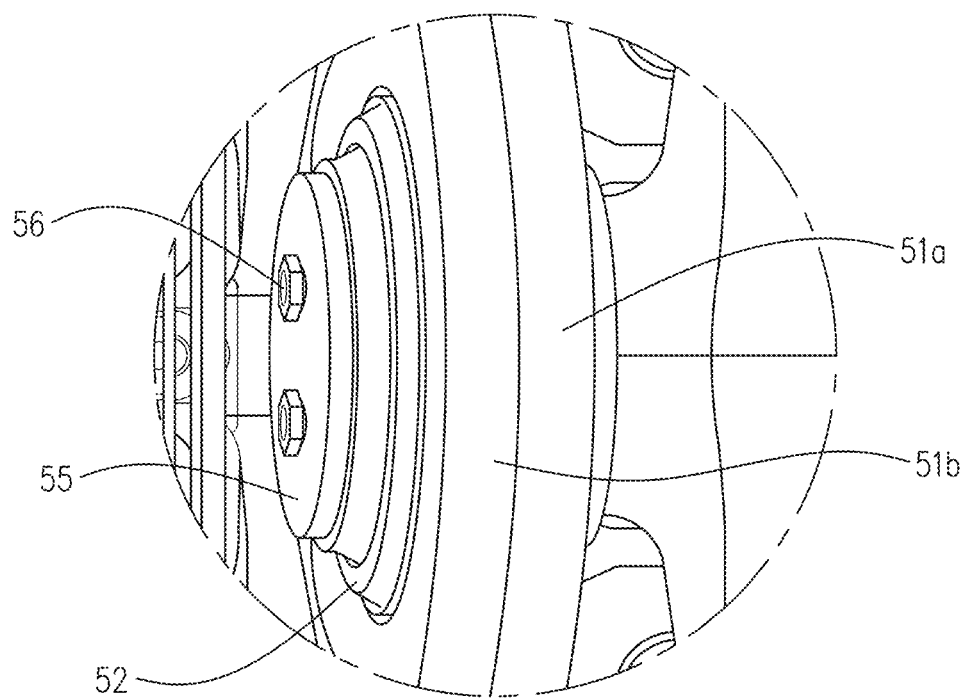
FIG. 7B is a top view of the forward shackle assembly as identified in FIG. 3.
Figure 7C:
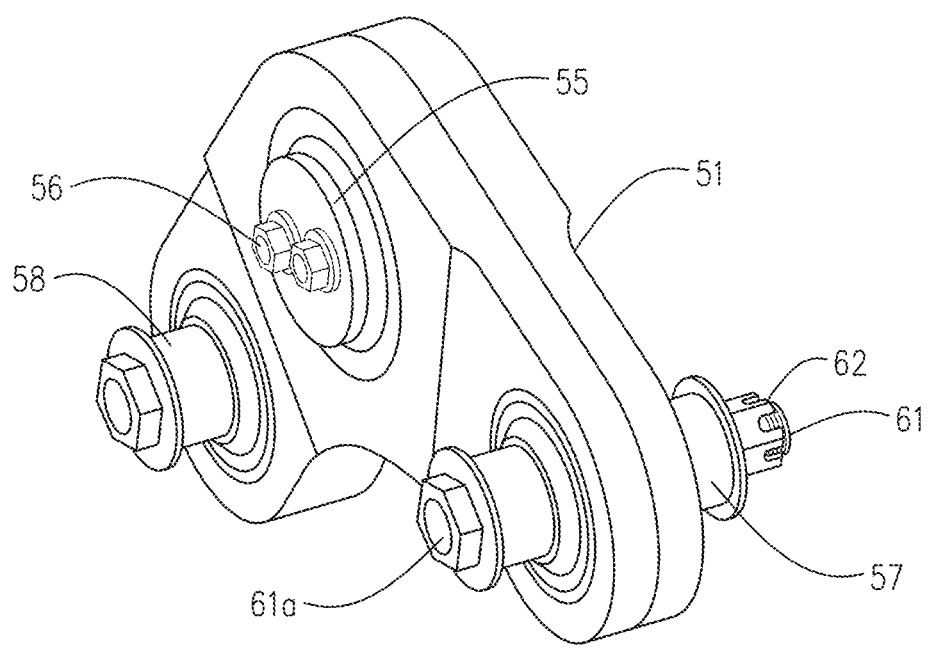
FIG. 7C is a perspective of the forward shackle assembly.
Figure 7D:
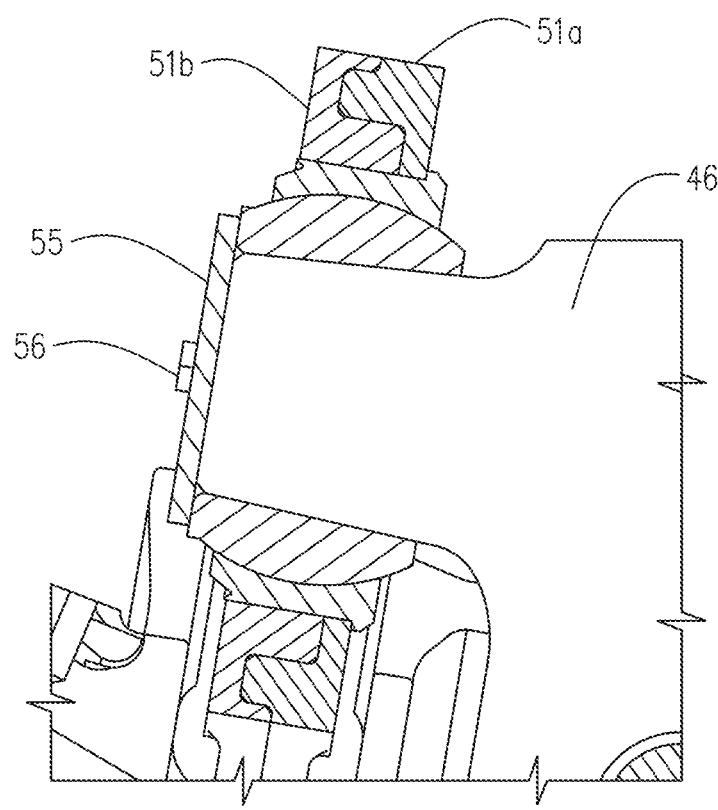
FIG. 7D is a cross sectional view of the forward shackle assembly taken along line.
Figure 7E:
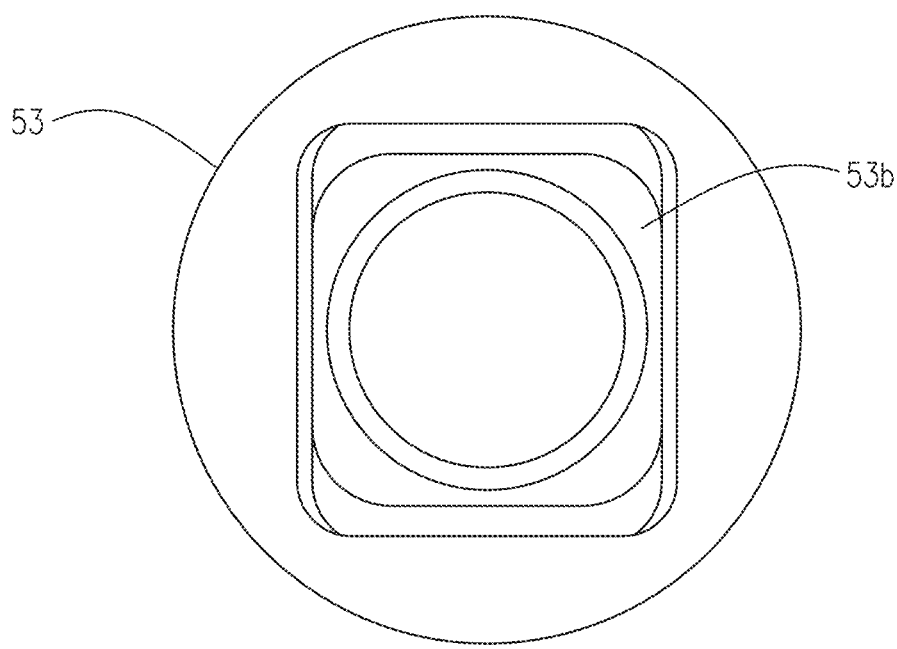
FIGS. 7E-7I depict the components of the cylindrical bearing found on airplane right of the forward shackle depicted in FIG. 7A.
Figure 7F:
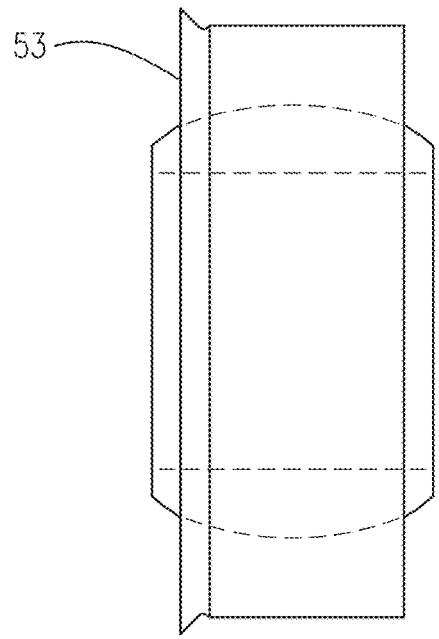
Figure 7G:
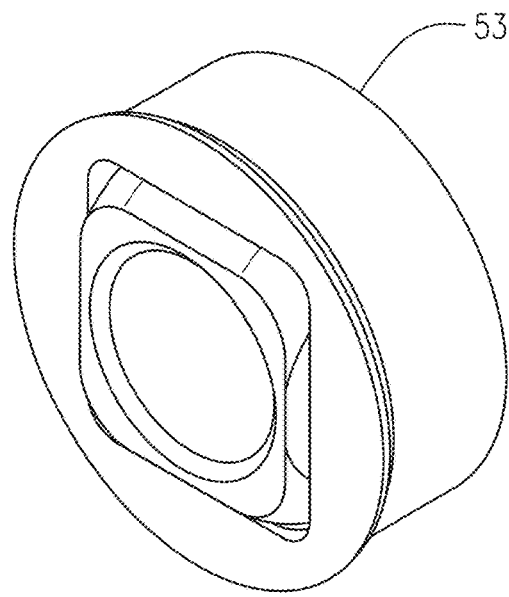
Figure 7H:
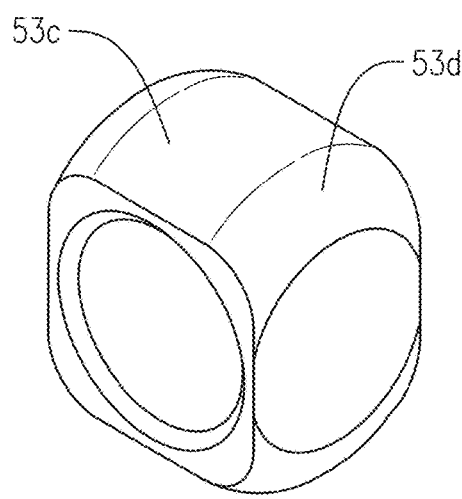
Figure 7I:
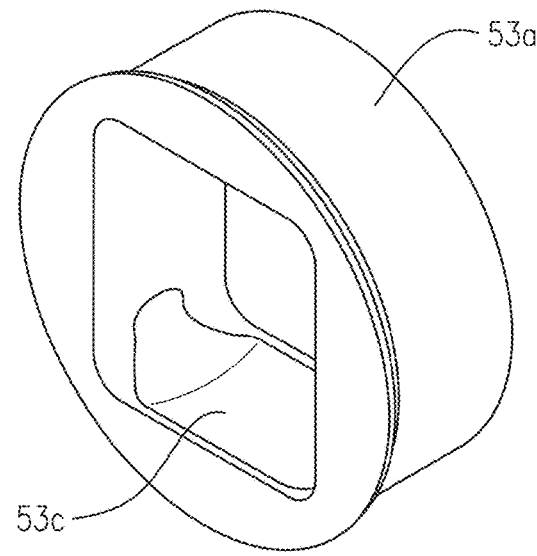

With reference to FIG. 7A, forward shackle assembly 50 includes coat hanger bracket 51 and bearings mounted within coat hanger bracket assembly 51. Centrally located within coat hanger bracket 51 is a center bearing 52. Center bearing 52 is sized to be fitted over the main fitting forward projecting boss 46. A retention plate positioned over center bearing 52 and secured to forward projecting boss 46 by bolts 56 provides secondary retention of forward shackle assembly 50 to main fitting 40. Bolts 56 pass through holes 55a in retention plate 55 and engage threaded holes 48 in forward projecting boss 46.

As further depicted in FIG. 7A, cylindrical bearing 53 is positioned to aircraft right of center bearing 52 and spherical bearing 54 is positioned to aircraft left of center bearing 52. However, the side-to-side orientation of cylindrical bearing 53 and spherical bearing 54 may be reversed and still provide the same functionality. Regardless of the side-to-side orientation of the two bearings, forward shackle assembly 50 provides a statically determinant system between forward engine mount 20 and engine forward mount front clevis mounting points 13a, 13b.

Spherical bearing 54 reacts load in both the vertical and lateral direction. Use of a spherical bearing on each side of center bearing 33 could lead to undue stress on coat hanger bracket 51 and result in load distribution dependent upon the stiffness of the engine 12. With reference to FIG. 5A, to avoid rattle and reduce wear, pin 57 passing through spherical bearing 54 must have a tight fit within spherical bearing 54 and engine forward mount front clevis mounting point 13b. In this application, a tight fight is generally between about 0.0 inches to about 0.002 inches. Thus, use of two spherical bearings will not accommodate thermal expansion between engine forward mount front clevis mounting points 13a, 13b and forward shackle assembly 50. As a result, use of two spherical bearings in forward shackle assembly 50 will not provide a statically determinant system.

However, use of cylindrical bearing 53 at one mounting point of forward shackle assembly 50 provides a loading point that reacts loads only in the vertical direction while permitting angular deflection at engine forward mount front clevis mounting point 13a. Thus, this configuration provides sufficient lateral clearance to accommodate tolerances. The combination of spherical bearing 54 and cylindrical bearing 53 provide a statically determinant system.

To ensure the desired loading of cylindrical bearing 53 in the vertical direction, the cylindrical bearing race 53a of cylindrical bearing 53 must be staked-in forward shackle assembly 50 such that cylindrical bearing inner member 53b when installed within cylindrical bearing race 53a has lateral clearance but no vertical clearance. As previously noted, the degree of clearance will depend upon the application. As depicted in FIG. 7A, the minimum lateral clearance between cylindrical bearing inner member 53b and race 53a is about 0.026 inches (about 0.66 millimeters) on each side or total lateral clearance of 0.52 inches (about 13.21 millimeters). The lateral clearance provided by cylindrical bearing 53 permits sliding of cylindrical bearing inner member 53b within cylindrical bearing race 53a. The clearance provided allows the mounting system to accommodate installation tolerances, thermal growth and deflections under normal operating conditions.

Figure 13:
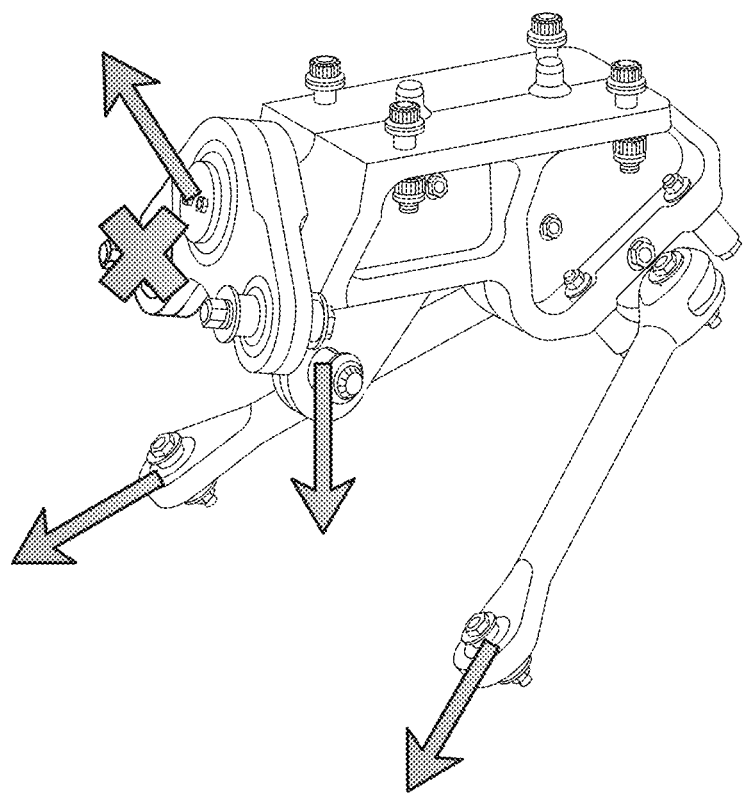
FIGS. 13-15 depict various load failure points by an-X- and the reacted loads following failure of the indicated fastener or component.
Figure 14:
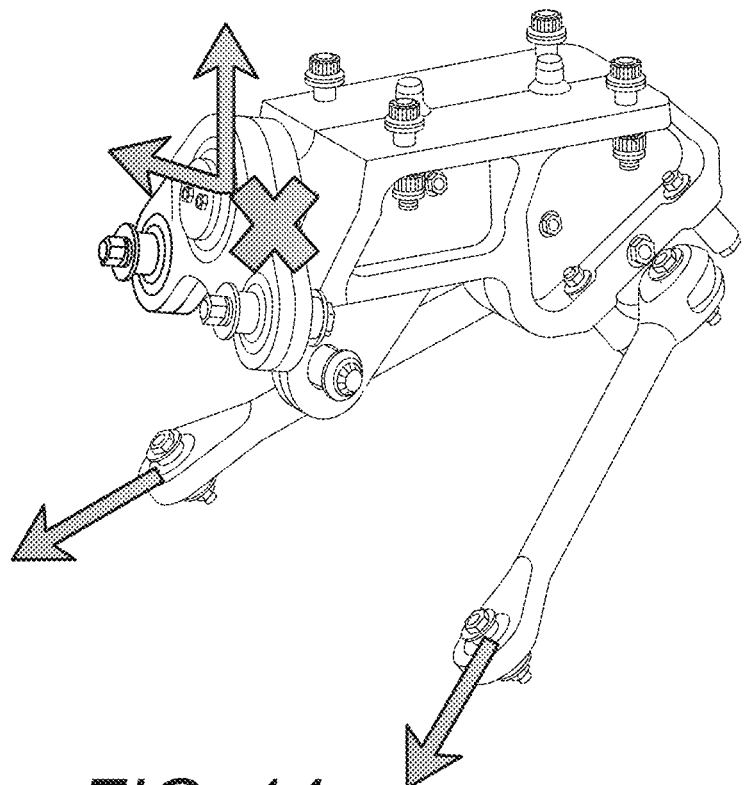
Figure 15:
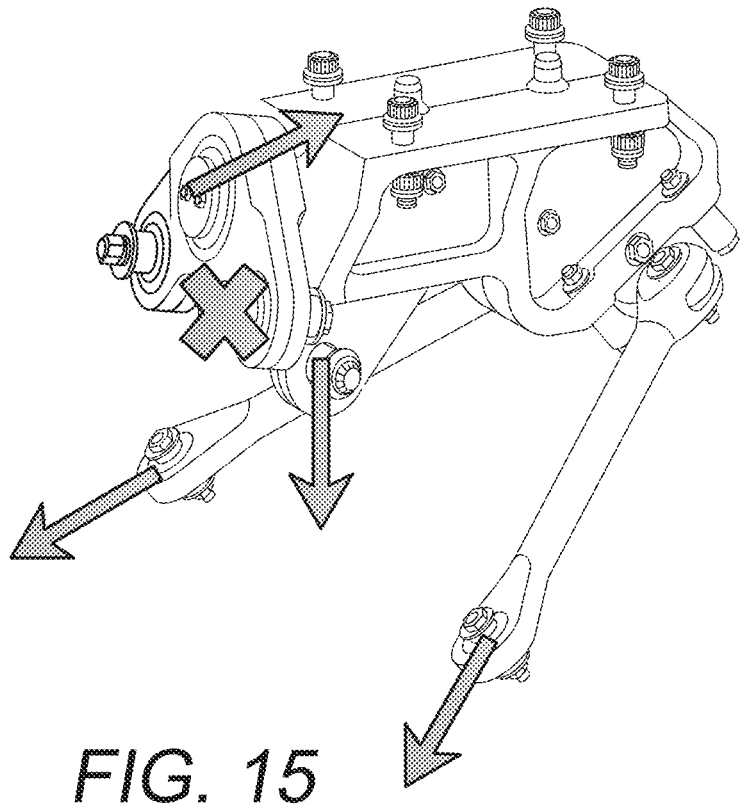

Under normal operating conditions, total forces experienced at forward shackle assembly 50 may be determined with reference to spherical bearing 54. However, in the event of a failure of spherical bearing 54, the clearances defined above will close due to the added load carried by cylindrical bearing 53 resulting in cylindrical bearing 53 reacting both lateral and vertical loads. Thus, after failure of spherical bearing 53, at least one gap between the parallel exterior walls of cylindrical bearing inner member 53b and race 53a closes. As illustrated in FIG. 15, the pin and bolt within fail-safe lug 49 will also engage fail-safe clevis mounting point 13c to only react vertical loads. Likewise, as depicted in FIG. 13, failure of cylindrical bearing 53 will transfer all load to spherical bearing 54. Thus, shackle assembly ensures a statically determinant system between engine forward mount front clevis mounting points 13a, 13b under normal operating conditions as well as under failure of either bearing 53, 54. FIG. 14 depicts the failure of one-half 51a or 51b of coat hanger bracket 51. In this failure mode, the surviving portion of coat hanger bracket 51 continues to react forces in the same manner as prior to the failure. Thus, cylindrical bearing 53 does not experience any changes in load. FIG. 15 depicts the failure of cylindrical bearing 53. Under this failure condition, spherical bearing will react all forces of thrust and vertical loads. Additionally, fail-safe lug 49 will engage to only react vertical loads.

FIGS. 7E-7I provide further details of cylindrical bearing 53. As depicted therein, cylindrical bearing 53 includes a cylindrical bearing inner member 53b with flat ends and a bearing race 53a. Bearing race 53a has two opposing interfaces 53c. Cylindrical bearing inner member 53b has two curved exterior walls defining bearing interfaces 53c and two parallel exterior walls. When installed within bearing race 53a, bearing interfaces 53c of cylindrical bearing inner member 53b contact bearing interfaces 53c of bearing race 53a. In normal operations, interfaces 53c of bearing race 53a and cylindrical bearing inner member 53b provide the only load contact points between bearing race 53a and cylindrical bearing inner member 53b. Thus, in this configuration cylindrical bearing inner member 53b slides within bearing race 53a in the unloaded direction. Additionally, with cylindrical bearing inner member 53b installed within race 53a, parallel walls of cylindrical bearing inner member 53b define a gap between cylindrical bearing inner member 53b and race 53a on each side of cylindrical bearing inner member 53b. Cylindrical bearing inner member 53b is installed by rotating 90° about the cylinder axis relative to the operation position and cylindrical bearing inner member 53b into outer cylindrical bearing race 53a. Rotating cylindrical bearing inner member 53b back to the operational position captures cylindrical bearing inner member 53b in cylindrical bearing race 53a, i.e. cylindrical bearing inner member 53b engages cylindrical inner interface 53c. Outer cylindrical bearing race 53a may optionally include a liner or cylindrical bearing 53 may have metal-to-metal contact between cylinder 53a and outer cylindrical bearing race 53a.

Figure 4B:
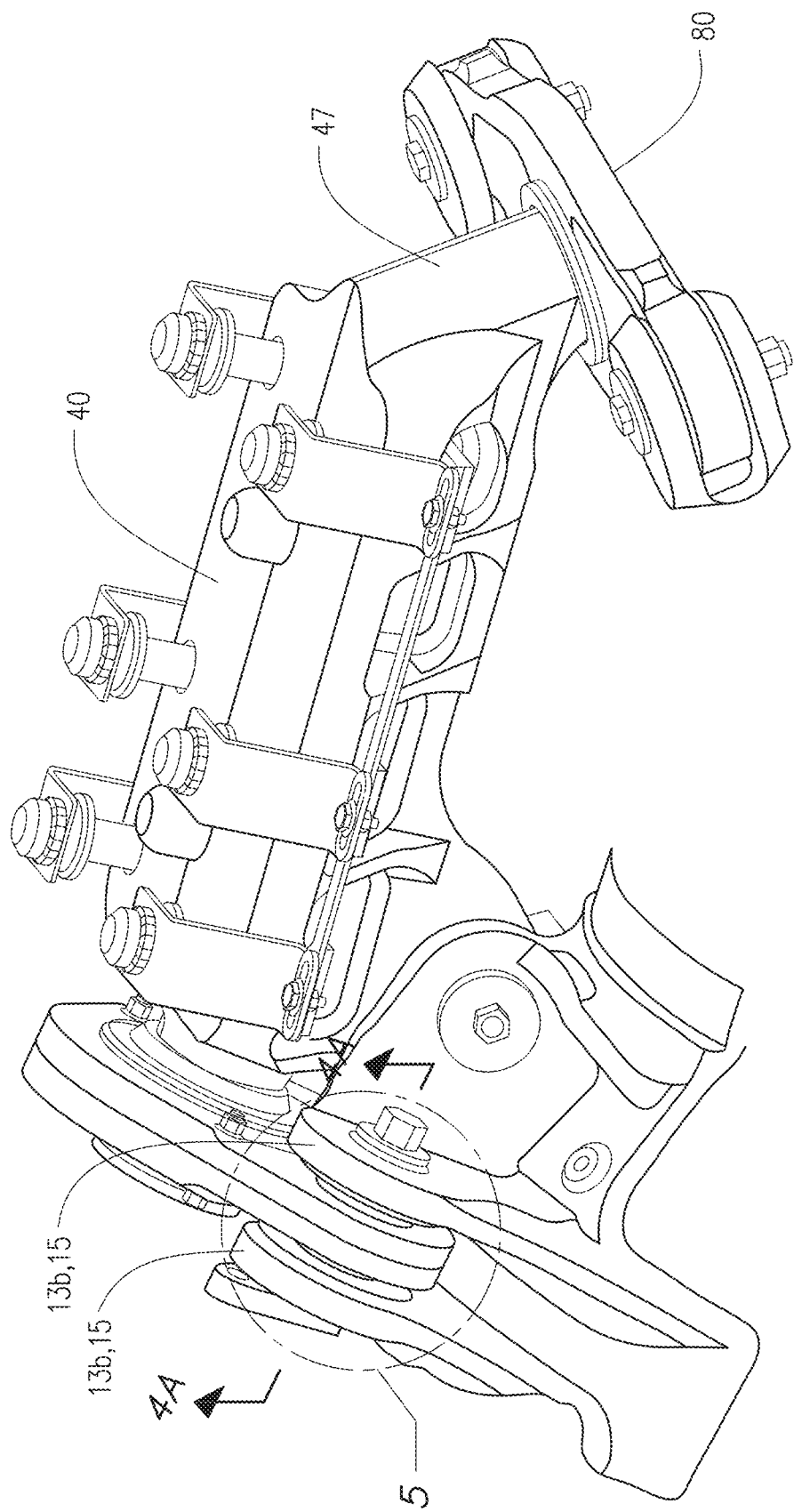
FIG. 4B is a perspective view of a forward engine mount for a turbine engine with the front shackle secured to a turbine engine.
Figure 8:
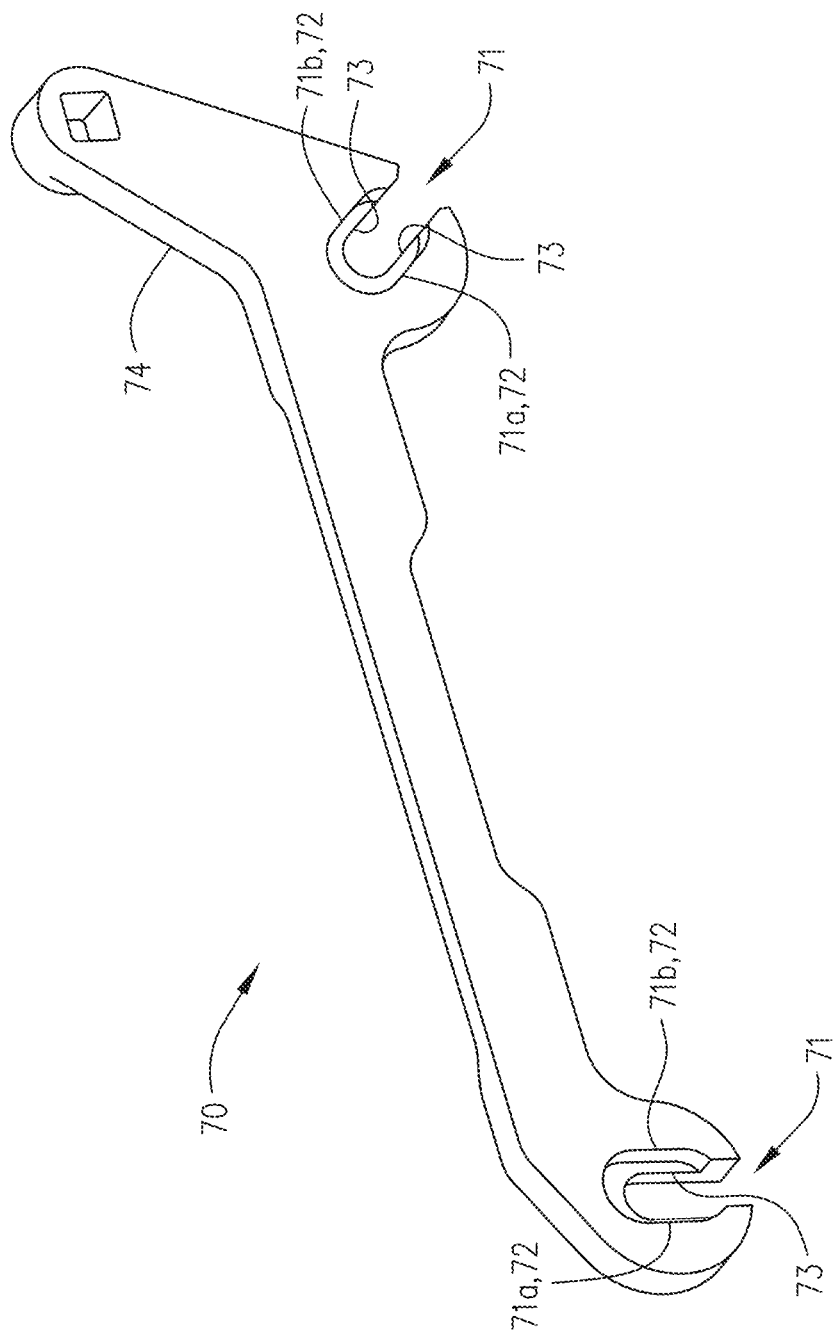
FIG. 8 depicts the wrench washer tool.
Figure 9:
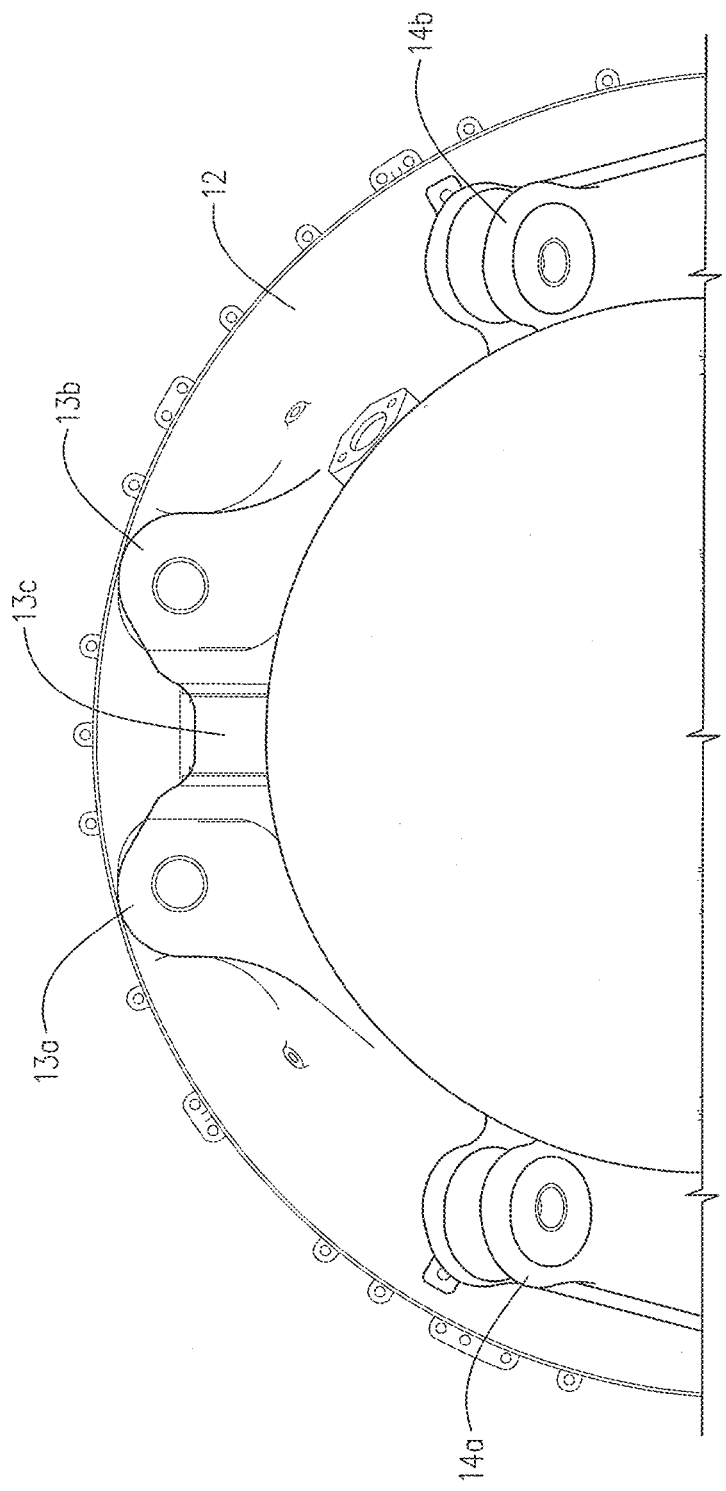
FIG. 9 depicts the forward housing of the engine with the interface attachment points associated with the forward mount.

As discussed above, forward shackle assembly 50 engages engine forward mount front clevis mounting points 13a and 13b. Paired shouldered or flanged bushings 60 are positioned within each clevis passageway 15 of each clevis point 13a, 13b. As depicted in FIGS. 4A, 4B and FIG. 8, pair flanged bushing 60 is a nested arrangement of an inner-flanged bushing 60a and an outer-flanged bushing 60b. Outer-flanged bushing 60b is press fit within passageway 15a and inner-flanged bushing 60a slid into outer-flanged bushing 60b. This configuration of bushings cooperates with pins 57 or 58, bolt 61 and a double wrench washer tool 70, depicted in FIG. 8, to permit securement of forward shackle assembly 50 to forward mount front clevis mounting points 13a, 13b without the need to specify selective assembly of components, i.e. use of stacked washers. Outer-flanged bushing 60b material may be 304 annealed CRES, 15-5PH, 17-4PH, H1150 with optionally 100% of all surfaces lubed. Inner-flanged bushing 60a should or could be 15-5PH, 17-4PH, condition H1025 or INCO 718. Typically, the inside diameter and end face of inner-flanged bushing 60a will be lubed at points where it contacts the ball of the bearing. Preferred lubes are moly based or graphite based. Alternatively, outer-flanged bushing 60b may be a bronze material such as Aluminum bronzes, copper beryllium (AMS454 type) or Copper-tin-nickel spinodal bronze (AMS4596 type). When using a bronze material for outer-flanged bushing 60b, inner-flanged bushing 60a will typically be formed from a steel alloy such as 15-5PH. The bronze-based bushing configuration would not require a lubricant.

Figure 5:
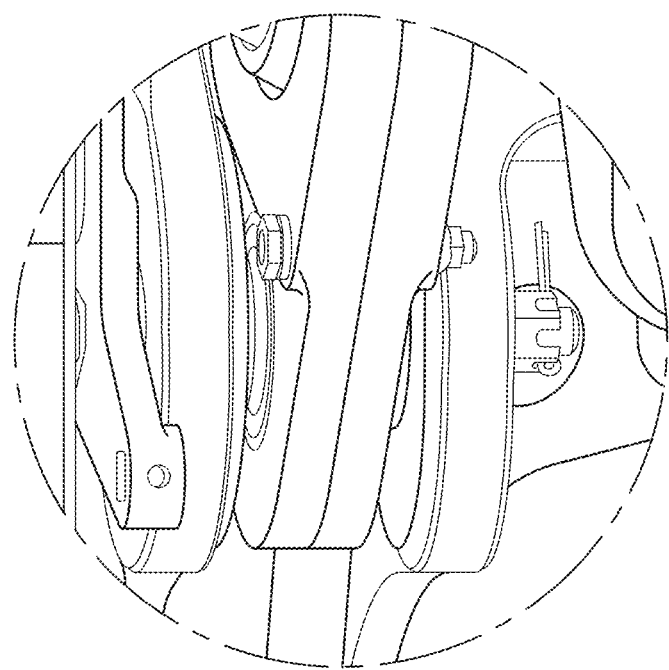
FIG. 5 is an enlarged perspective view of a shackle interface on airplane left with clevis points on the engine.
Figure 6A:
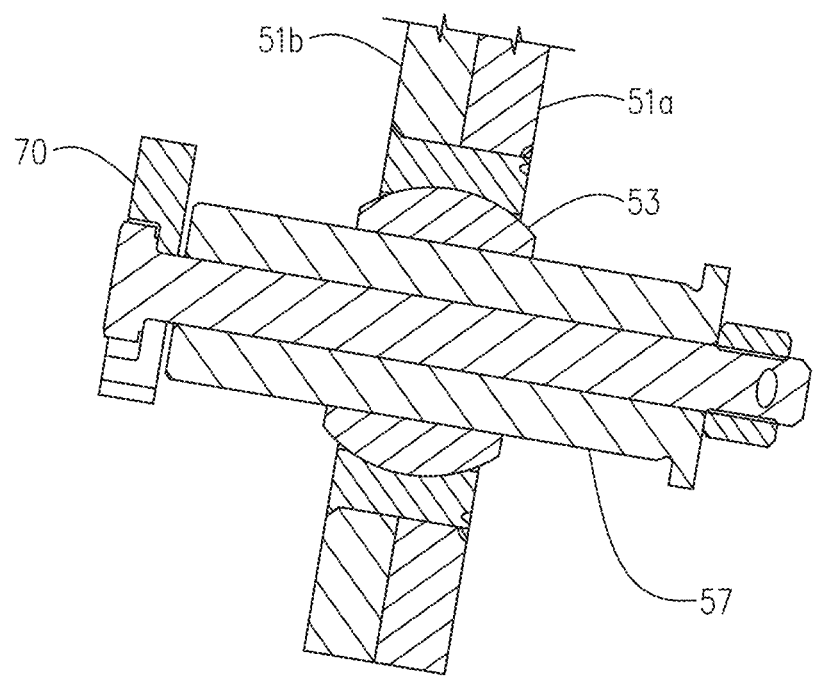
FIG. 6A is a sectional view of a shackle on the airplane right of the engine.

FIGS. 4A and 6A depict the configuration and relationship of main fitting left 40b of forward shackle assembly 50 positioned within lugs 15 of engine forward mount front clevis mounting point 13b. After positioning of coat hanger bracket 51 in alignment with engine forward mount front clevis mounting points 13a and 13b, pin 58 and bolt 61 are positioned within the assembly by passing from the rear of coat hanger bracket 51 through spherical bearing 54 within coat hanger bracket 51 and through clevis mounting point 13b. Likewise, pin 57 and bolt 61 are positioned within the assembly passing from the rear of coat hanger bracket 51 through cylindrical bearing 53 and clevis mounting point 13a. Washers or spacers 75, as needed, are placed on bolts 61 prior to securing a castellated nut or other locking mechanism on bolts 61. As depicted, the head 61a of each bolt 61 is sized to pass through the opening of spherical ball 54a and cylindrical bearing inner member 53b. Further as depicted in FIGS. 4A, 5A and 6A, bolt 61 has a length such that double wrench washer tool 70 may be positioned between pins 57 and 58 and each bolt head 61a with castellated nut 62 or other locking mechanism secured to each bolt 61 in the assembled but pre-torqued configuration.

Double wrench washer tool 70 provides multiple functions within the configuration of fail-safe engine mounting system 10. As depicted in FIG. 8, double wrench washer tool 70 has two slots 71 positioned a distance apart. The distance between slots being equal to the centerline of the clevis mounting point passageways 15a in lugs 15. Each slot having a distance such that the parallel walls 71a and 71b of the slots serve as wrench flats 72. Additionally, parallel walls 71a and 71b carry inwardly projecting flanges 73. Flanges 73 are separated by a distance approximately equal to the diameter of bolts 61. Thus, when positioned between bolt heads 61a and pins 57, 58, double wrench washer tool 70 acts both as a wrench with wrench flats 72 engaging bolt heads 61a to preclude rotation thereof during torquing operations and flanges 73 acting as retaining washers to engage and capture bolt heads 61a. Thus, double wrench washer tool secures and precludes loss of pins 57, 58 thereby precluding pins 57, 58 passing through the bearings. Double wrench washer tool 70 additionally carries a torque application point 74 suitable for engagement by any conventional torque application tool. As depicted in FIG. 8, the torque application point is an upwardly projecting ear 74 with an opening suitable for receiving a drive mechanism. Ear 74 is not limited to an upward projection; rather, torque application point 72 needs to provide sufficient clearance beyond the confines of the equipment being assembled to permit engagement by any conventional torque application tool.

Thus, as described above, positioning of forward shackle assembly 50 with coat hanger bracket 51 aligned with engine forward mount front clevis mounting points 13a, 13b places cylindrical bearing assembly 52 and spherical bearing assembly 54 in alignment with openings 15a of clevis mounting point lugs 15. Final securement of coat hanger bracket 51 to clevis mounting points 13a, 13b entails positioning of bolts 61 through pins 57 and 58 and castellated nuts 62 on bolts 61 followed by securing bolt heads 61a with double wrench washer tool 70. The wrench flats 72 of double wrench washer tool 70 are positioned such that wrench flats 72 and flanges 73 engage bolt heads 61a of each bolt 61. With double wrench washer tool 70 positioned between bolt heads 61a and pins 57, 58, each bolt 61 can be turned until each head 61a aligns with wrench flats 72. Once each bolt head 61a engages wrench flats 72 of double wrench washer tool 70, then each associated castellated nut 62 or other locking mechanism can be tightened to secure forward shackle assembly 50 to engine forward mount front clevis mounting point 13a, 13b.

Although described herein as a castellated nut 62 and cotter pin (not shown) arrangement, the device opposite of bolt head 61a may be any suitable nut or securement component having at least one secure locking mechanism. In some applications, the securement component will have at least two secure locking mechanisms, e.g. a locking compound and at least one physical locking component. Thus, upon final assembly, double wrench washer tool 70 remains as an integral component of the joint between engine 12 and forward shackle assembly 50.

FIG. 4A depicts a sectional view of the forward shackle assembly 50 positioned within clevis mounting lugs 15 taken along lines A-A of FIG. 4B. Thus FIG. 4A depicts a spherical bearing. However, the relationship of the bearings 53 and 54 and nested bushings 60 with forward shackle assembly 50 positioned within a clevis point 13a or 13b will be the same. FIG. 4A depicts the relationship of engine forward mount front clevis mounting points 13a, 13b, pins 57 or 58, bolt 61, spacer 75, castellated nut 62, outer-flanged bushing 60b, i.e. the press fit bushing, inner-flanged bushing 60a and double wrench washer tool 70. As depicted in FIG. 4A, pins 57 and 58 have a flange 57a, 58a, respectively, positioned at the end of the pin adjacent to the threaded end of bolt 61. Flange 58a may be omitted and replaced by a large washer or spacer 75 having a diameter sufficient to engage inner- and outer-flanged bushings 61a, 61b. Normally, spherical ball 54a or cylindrical bearing inner member 53b would be positioned between the shoulders of inner bushings 60a. As discussed above, forward shackle bearings 53, 54 are positioned within engine forward mount front clevis mounting points 13a, 13b. During securement of forward shackle assembly to engine forward mount front clevis mounting points 13a, 13b, bolt head 61a and pin flange 58a force inner-flanged bushing 60a into engagement with spherical ball 10 of spherical bearing 54 or in the case of the cylindrical bearing 53 into engagement with the cylindrical bearing inner member 53b. Thus, all relative movement takes place between inner- and outer-flanged bushings 60a and 60b. By forcing all motion between the inner- and outer-flanged bushings 60a and 60b all potential damage to the pins 57, 58 in a failure mode is avoided. Further, the nested bushing arrangement precludes bending of the engine clevis lug 15 during installation, removal and/or servicing. Thus, the torquing operation does not place stress on clevis mounting point lugs 15. The double bushing arrangement may be used with any clevis point and bearing assembly without the need for wrench washer 70. If the assembly of a shackle or other bearing mount to a clevis point is not obstructed by other components, a washer or spacer 75 having a diameter sufficient to engage both inner- and out-flanged bushings 60a, 60b may be substituted for wrench washer 70. Washer or spacer 75 will be placed between bolt head 61a and nested bushing 60. As discussed above, this configuration of nested bushings 60 and spacers or washers 75 will not place stress on clevis mounting point lugs 15 during torquing of nut 62 and bolt 61.

Figure 3:
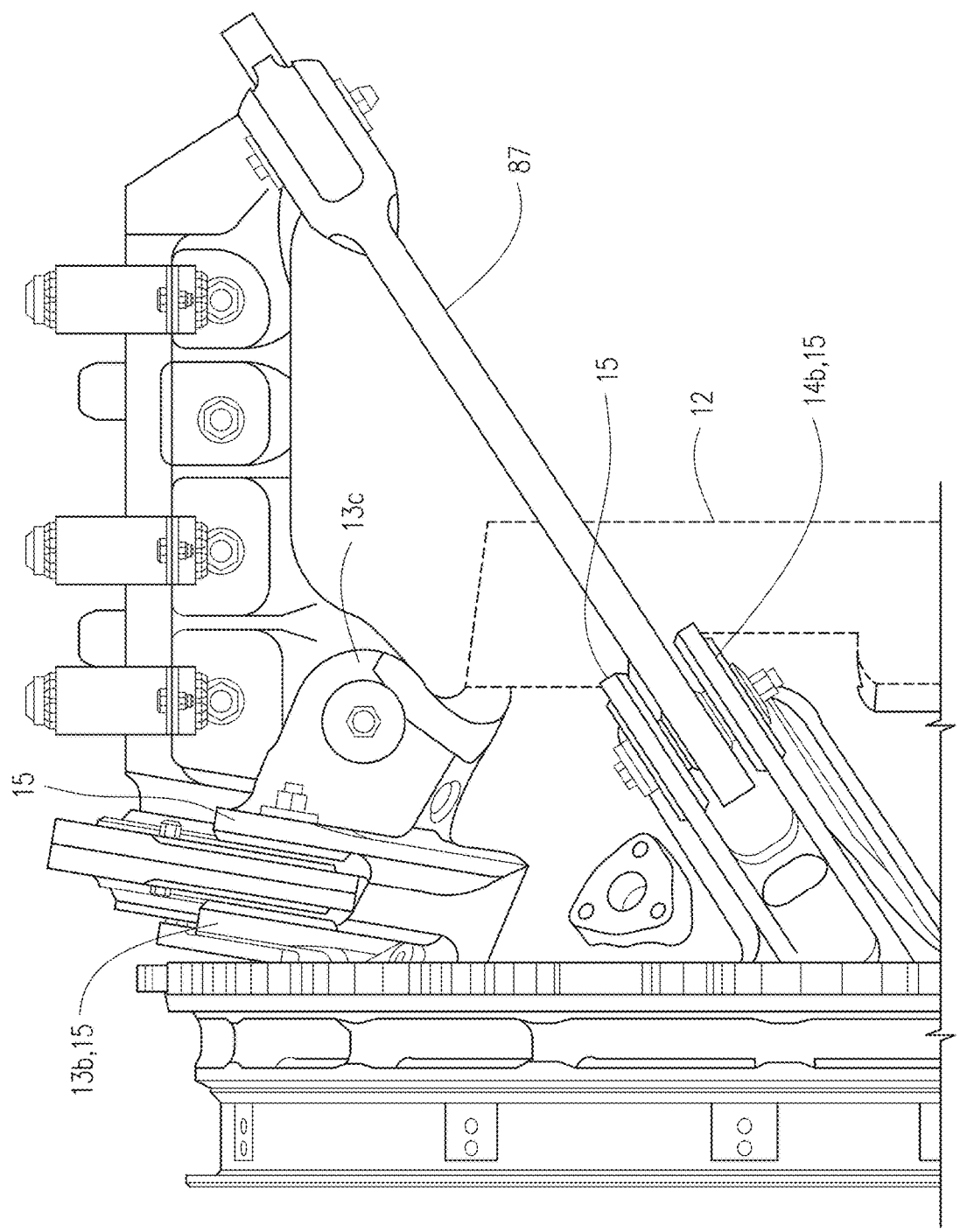
FIG. 3 is a side view of a forward engine mount for a turbine engine depicting the interface attachment points between the forward engine mount and the turbine engine.
Figure 6B:
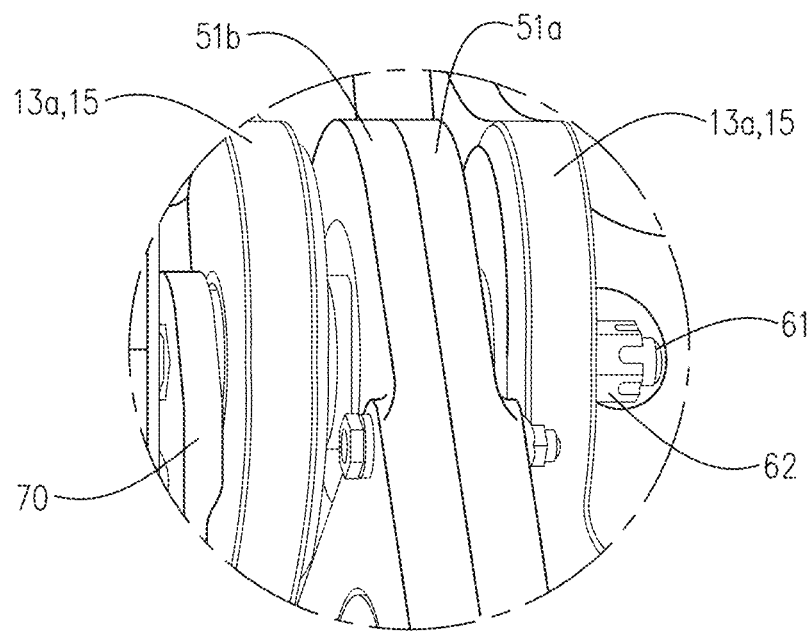
FIG. 6B is an enlarged perspective view of a shackle interface on airplane right with clevis points on the engine.

Thus, as depicted in the FIGS. 3, 5 and 6B, double wrench washer tool 70 and castellated nut 62 retain forward shackle assembly 50 within engine forward mount front clevis mounting points 13a, 13b thereby securing forward shackle assembly engine 12. Although described herein as a single component, double wrench washer tool 70 may also be provided as separate individual wrench washers with each having a suitable torque application point.

To complete the assembly of forward engine mount 20 to engine 12, main fitting fail-safe lug 49 is secured to engine fails-safe clevis 13c. This mounting point does not experience direct engagement unless both bearings in coat hanger bracket 51 fail. Additionally, the thrust links 85 carried by whipple tree support 80 must be secured to engine forward lower clevis points 14a and 14b.

Figure 2A:
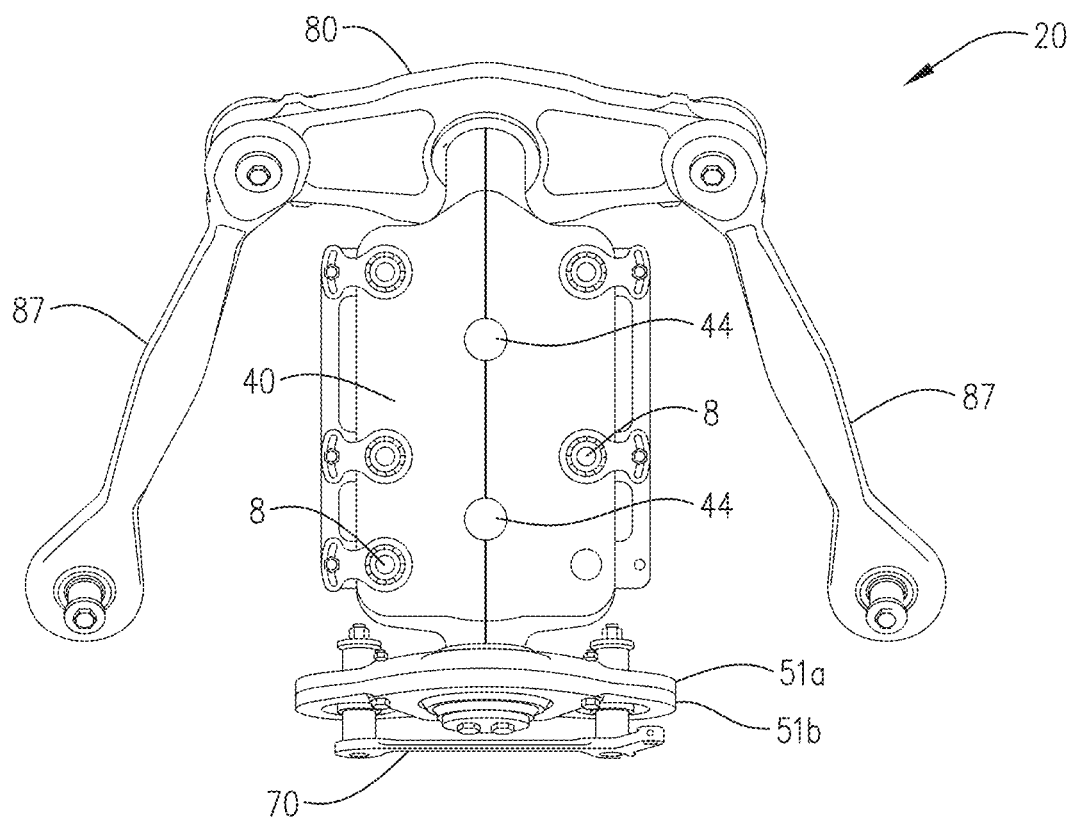
FIG. 2A is a top view of a forward engine mount for a turbine engine.
Figure 2B:
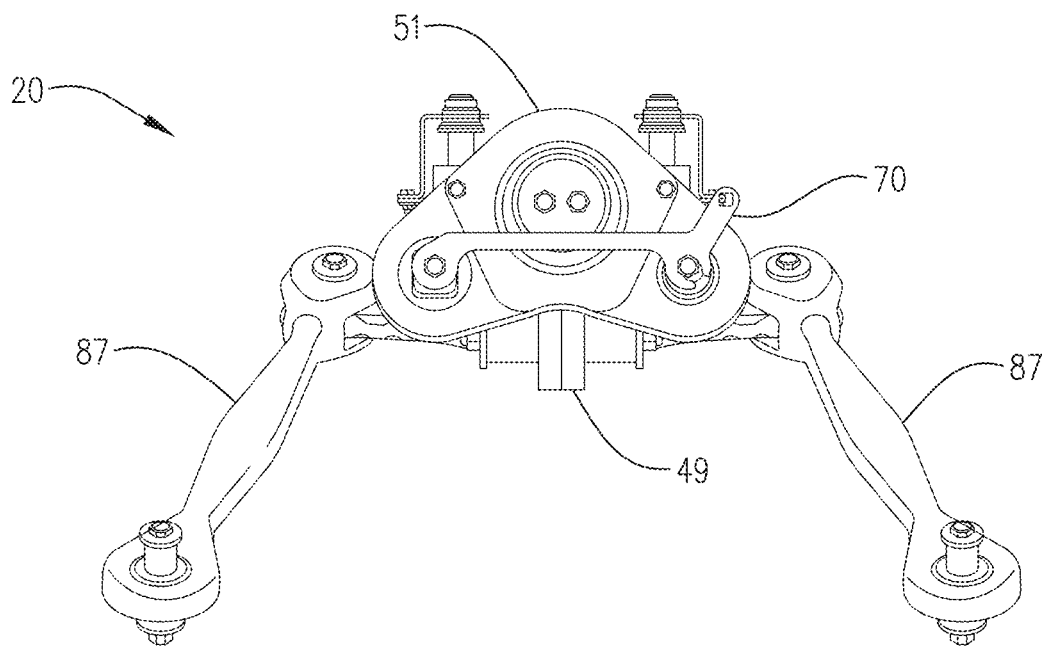
FIG. 2B is a front view of a forward engine mount for a turbine engine.
Figure 2C:
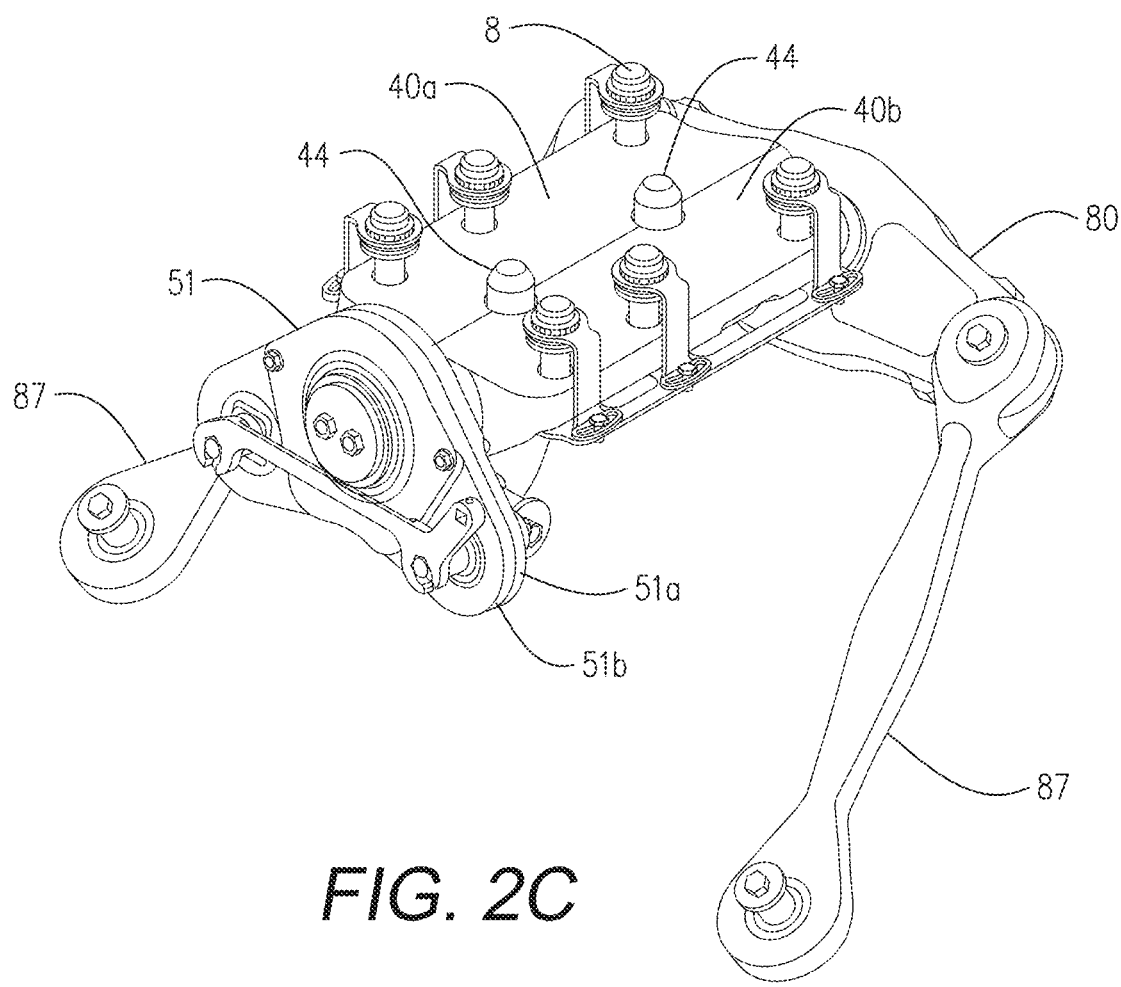
FIG. 2C is a top side perspective view of a forward engine mount for a turbine engine.
Figure 2D:
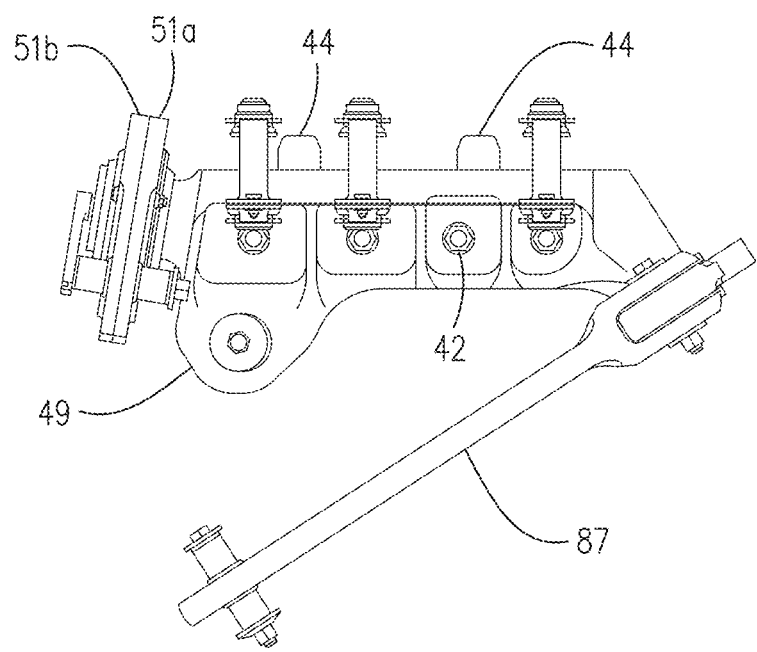
FIG. 2D is a side view of a forward engine mount for a turbine engine.
Figure 2E:
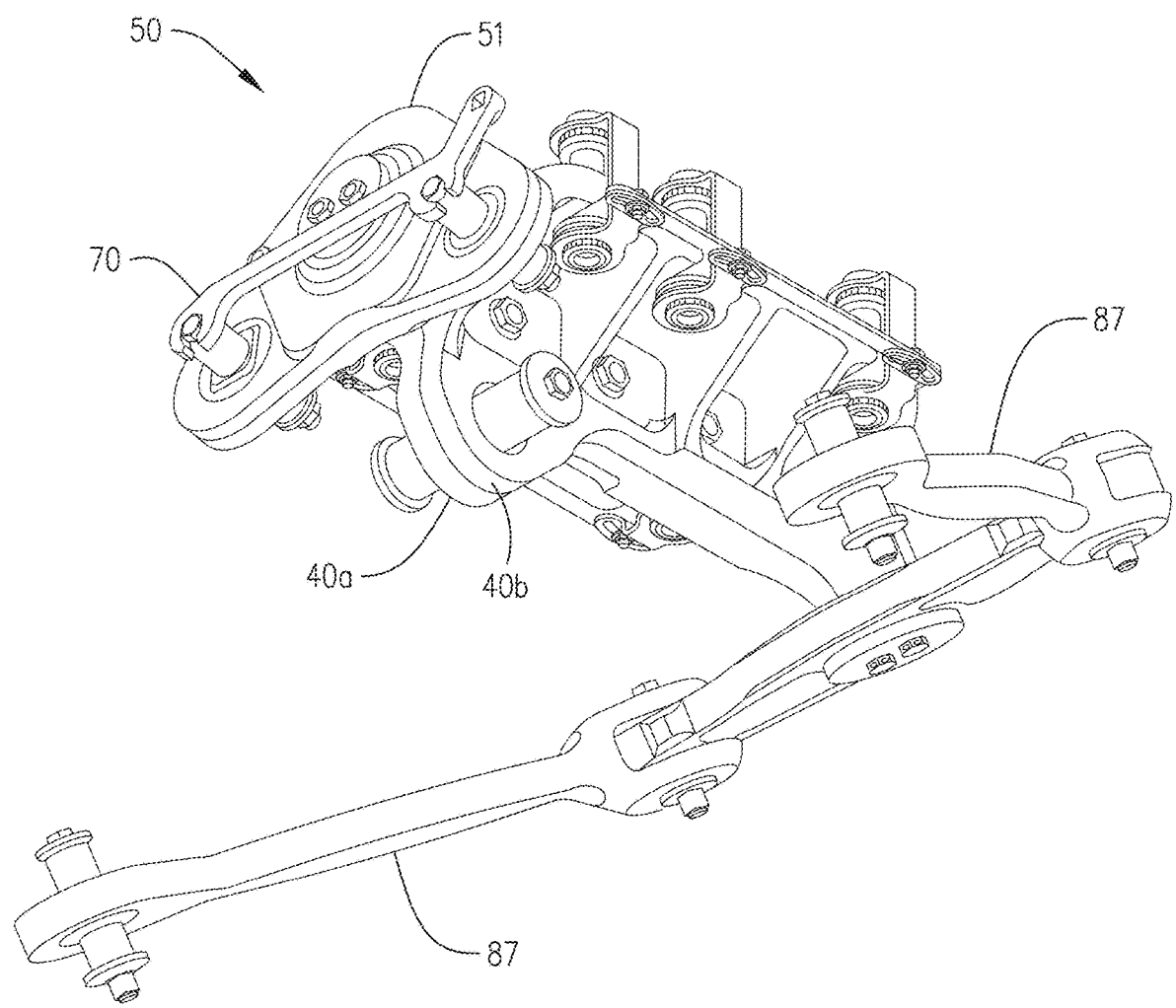
FIG. 2E is a bottom side perspective view of a forward engine mount for a turbine engine.
Figure 2F:
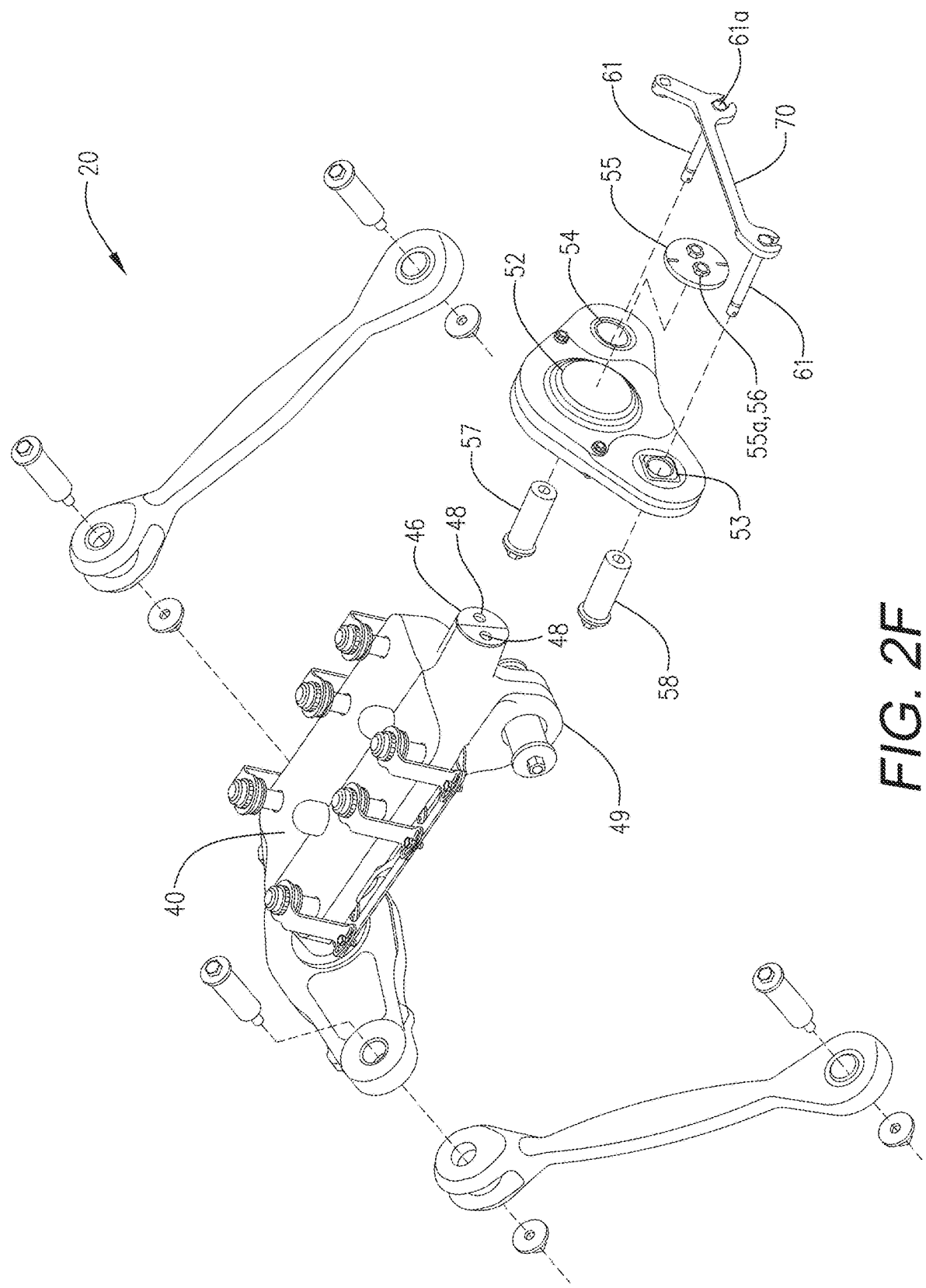
FIG. 2F is an exploded assembly view of a forward engine mount for a turbine engine.
Figure 2G:
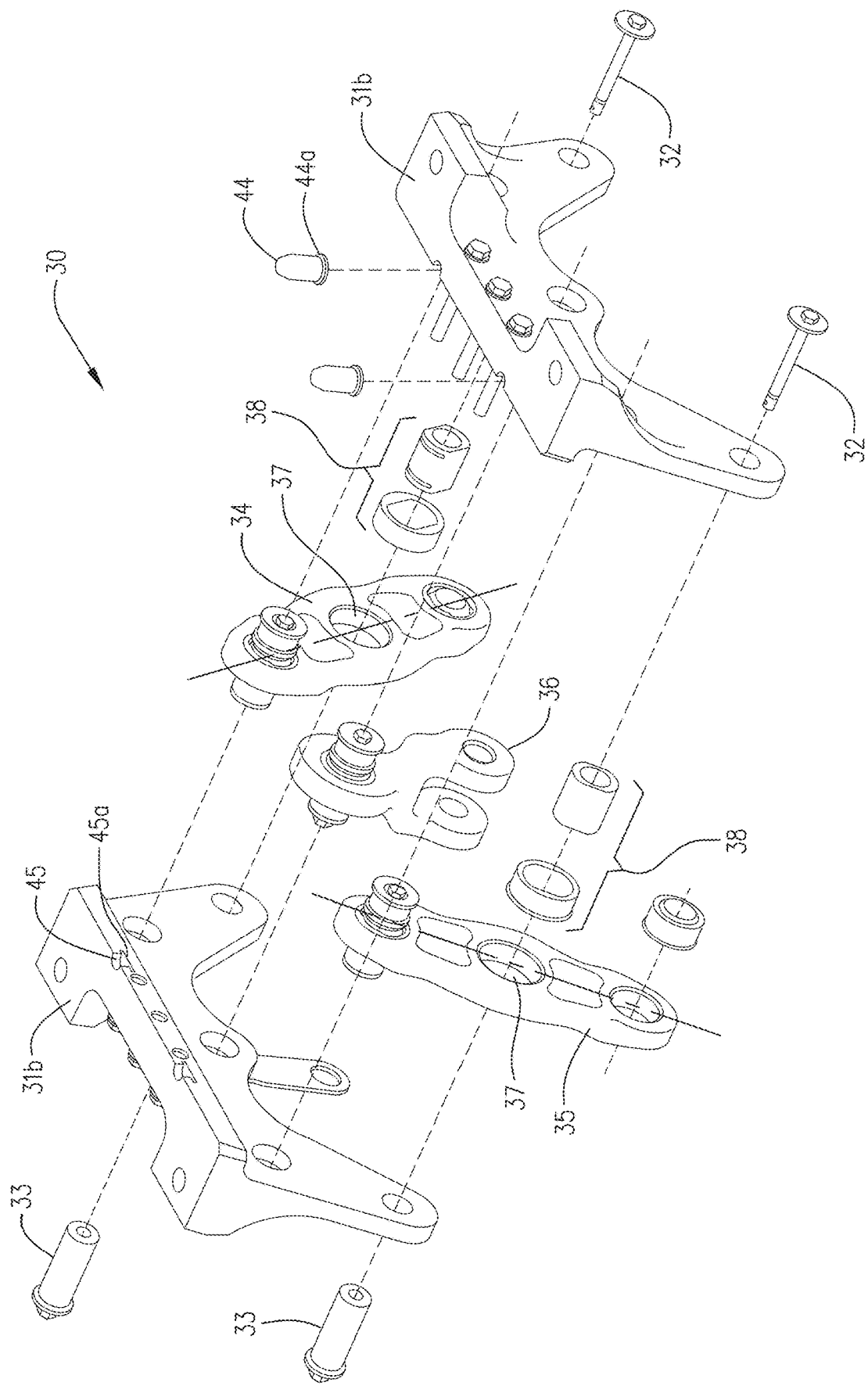
FIG. 2G is an exploded assembly view of an aft engine mount for a turbine engine.
Figure 2H:
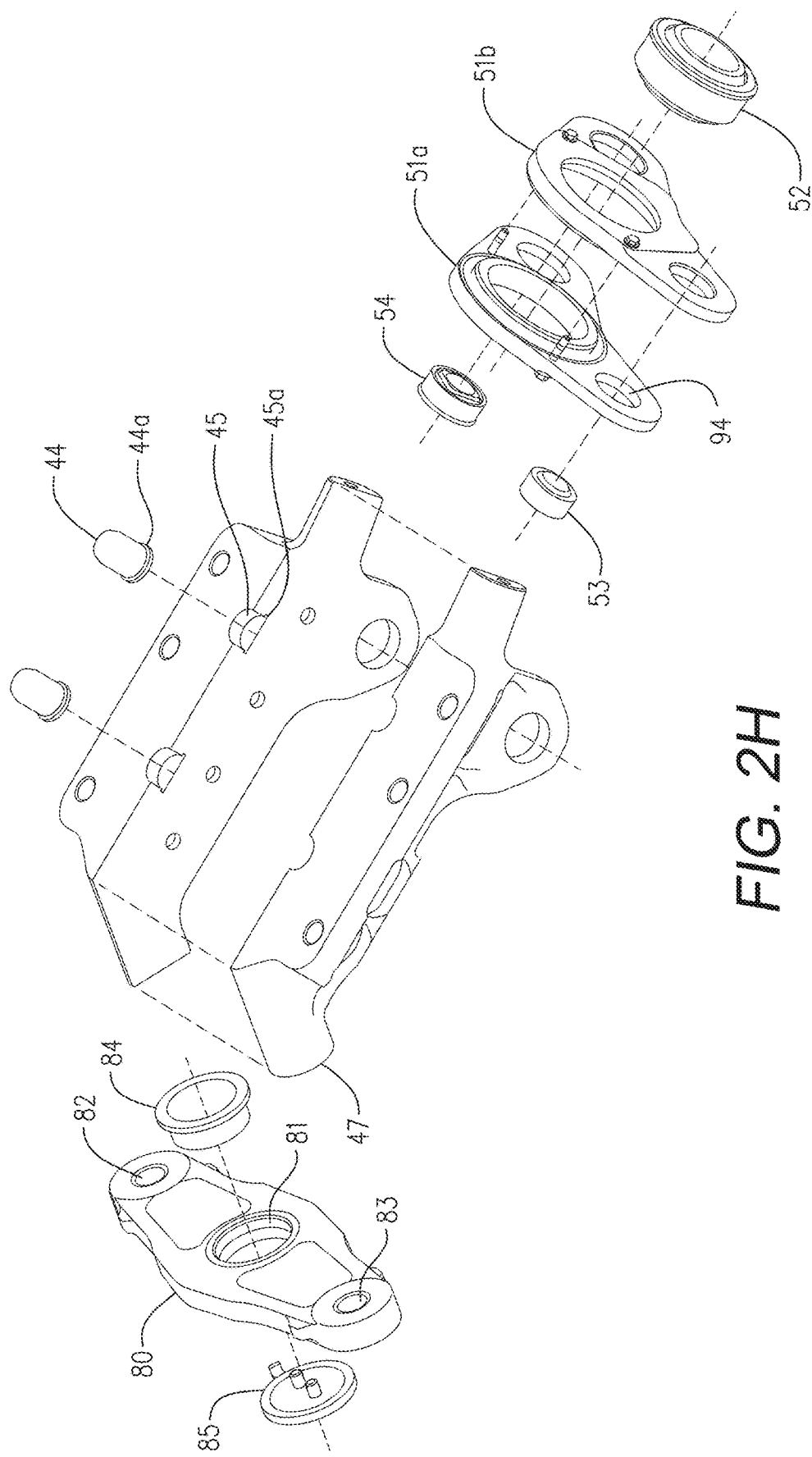
FIG. 2H is an exploded assembly view of the main fitting, the forward shackle and the whipple tree shackle of the forward engine mount for a turbine engine.

With reference to FIGS. 2E and 2H, whipple tree support 80 includes three openings, a central opening 81 and left and right openings 82, 83. Central opening 81 is sized to receive a bearing 84 with bearing 84 configured as an interference fit over rearward and downward projecting boss 47. A cap 85 having a diameter greater than opening 81 is positioned over opening 81 with whipple tree 80 positioned on bearing 84, bolts 86 passing through cap 85 and into boss 47 secures whipple tree 80 to boss 47. As depicted in FIG. 2F, each thrust link 87 is secured to whipple tree 80 by a clamped pin joint arrangement where a pin 88 having an external diameter sized to fit within thrust link opening 87a passes through whipple tree opening 82 or 83. A bolt passes through the pin 88 and a nut 90 with an optional washer or other conventional mechanism for retaining bolt 89 within pin 88 secures thrust link 87 to whipple tree 80. Typically, nut 90 for retaining bolt 90 will be a self-locking nut or a castellated nut with cotter pin. Each forward end of thrust links 80 with thrust link opening 87b is positioned within the respective engine forward lower clevis point 14a, 14b. Typically, for lower clevis points 14a and 14b, each clevis point lug 15 will have a bushing 15b positioned within the clevis mounting point passageway 15a. Each forward end of thrust link 80 contains a spherical bearing similar to spherical bearing 54. A pin 88 passes through bushing 15b and spherical bearing 54 with a bolt passing through pin 88 and is retained by a nut 90. Nut 90 may be a self-locking or a castellated nut with cotter pin.

Figure 10:
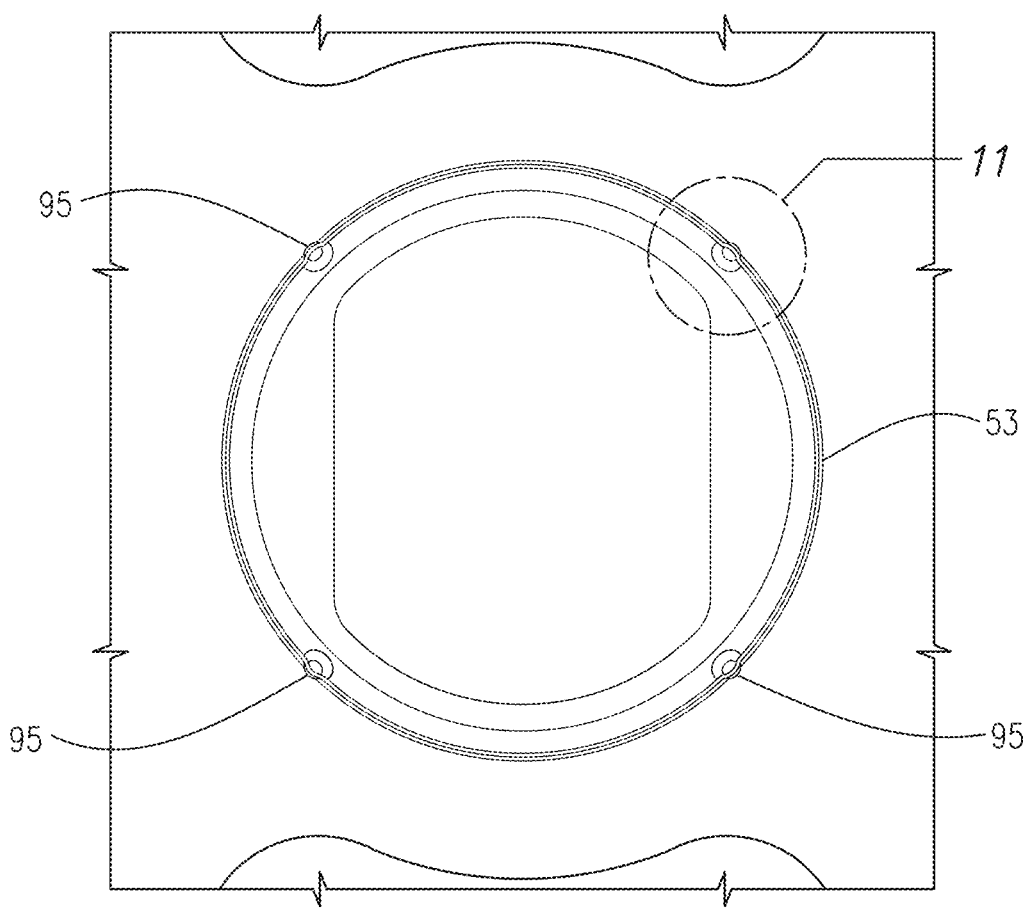
FIG. 10 depicts the improved staking configuration for the cylindrical bearing.
Figure 11:
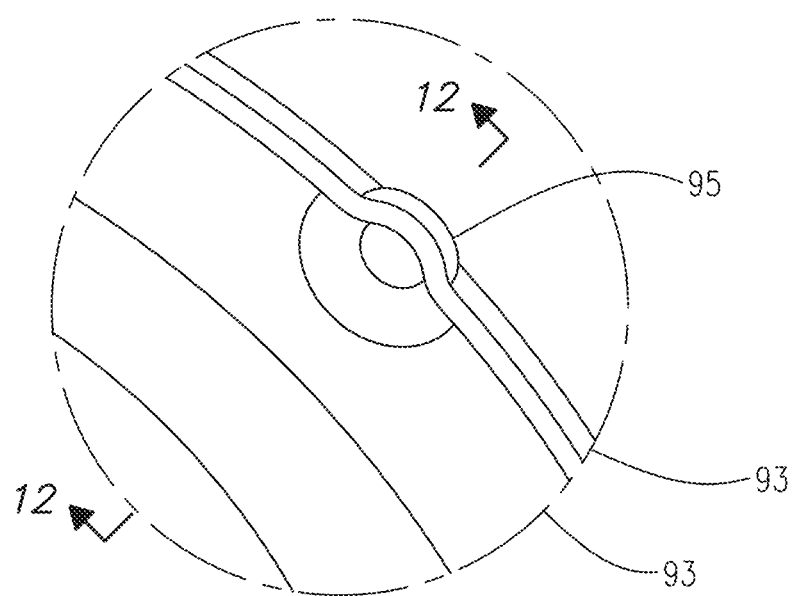
FIG. 11 depicts the detail of area 12 depicted in FIG. 11.
Figure 12:
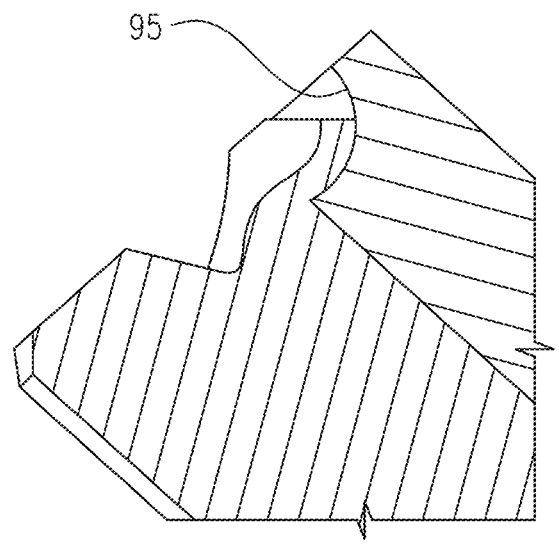
FIG. 12 depicts the detail of the race staked into the chamfer.

As discussed above, cylindrical bearing 53 as included within coat hanger bracket 51 provides a statically determinant system. To provide this system, cylindrical bearing 53 must be arranged such that it carries load only in the vertical direction. Accordingly, rotation of bearing within forward shackle assembly 50 during assembly of forward shackle assembly 50 forward mount front clevis mounting points 13a and 13b must be avoided. To preclude rotation of cylindrical bearing 53 within forward shackle assembly 50, cylindrical bearing race 53a is staked within forward shackle assembly 50. With reference to FIGS. 10-12, the staking process includes the steps of forming a staking groove 92 within cylindrical bearing race 53a and machining a matching chamfer 93 within the opening 94 of forward shackle assembly 50. Following machining of chamfer 93, one or more spherical ball end mill "divots" 95 are machined into chamfer 93. After positioning of cylindrical bearing race 53a in opening 94 and conventionally staking cylindrical bearing race 53a, a second staking step is used. In the second staking step, a ball nosed "punch" or other appropriate staking tool is placed over the race at the location of each divot 95 and hammered with sufficient force to drive race material into each divot 95. Thus, the second staking step forces the staked bearing to additionally conform with divot 95 previously machined into chamfer 93. The additional staking step increase the torque restraint value of the staked-in bearing by two to three times the torque restraint value of the conventionally staked-in bearing. For a bearing race located within a two-inch hole, the torque restraint value will increase from about 500 inch-lbf (about 56.6 Newton-meters) for conventional staking to at least 1000 inch-lbf (about 113 Newton-meters) and typically will increase to 1500 inch-lbf (about 169.5 Newton-meters) depending on the metal used for the race of the staked-in bearing.

FIG. 2G depicts an aft mount 30. Aft mount 30 includes a pylon fitting 31 made up by pylon halves 31a and 31b. Joinder of halves 31a and 31b by bolts 32 and pins 33 captures and retains three links 34, 35 and 36. Links 34 and 35 attach to pylon fitting 31 with spherical bearings 54 and to rear engine clevis points 16 with spherical bearings 54. As described above, a bolt 61 and nut 62 will retain links 34 and 35 at each mounting point. Link 36 is also joined to pylon fitting 31 by staked oriented bearings 38 positioned within openings 37. Staked oriented bearings 38 do not carry load along the axis of links 34, 35. Rather, bearings 38 only carry load perpendicular to the axis running along the length of links 34 and 35. The staking operation for oriented bearings 38 include the use of a chamfer and divot as described above with regard to oriented cylindrical bearing 53 of forward mount 20. Additionally, aft mount 30 includes at least two shear pins 44 with each shear pin 44 having a lower lip or flange 44a. Each shear pin is sandwiched between halves 31a and 31b of pylon fitting 31. Thus, shear pins 44 are located on the centerline of aft mount 30. Location of shear pins 44 on the centerline of aft mount 30 ensures lateral loads are carried without inducing moments in that direction. As assembled one shear pin 44 is a tight fit, about 0.002 inches (about 0.051 millimeters) clearance between pin 44 and pylon 31 and a second shear pin 44 is a slight clearance fit, about 0.01 inches (about 0.25 millimeters) clearance between pin 44 and pylon 31. Thus, the second shear pin acts as a fail-safe.

Other embodiments of the present invention will be apparent to one skilled in the art. As such, the foregoing description merely enables and describes the general uses and methods of the present invention. Accordingly, the following claims define the true scope of the present invention.

What is claimed is:

1. A bearing assembly configured for use with an aircraft engine comprising:
   a pair of lugs;
   a pair of nested bushings positioned within each lug, each nested bushing having an inner flanged bushing and an outer flanged bushing, said inner flanged bushing extending beyond said lug;
   a bearing positioned between said lugs such that said bearing is adjacent to the flanges of each nested bushing;
   a pin passing through said bearing, said pin having a first end and a second end,
   a flange carried by said second end of said pin, said flange carried by said pin engaging said inner flanged bushing located within the lug adjacent to said second end of said pin;
   a bolt positioned within said pin, said bolt having a threaded end protruding from the second end of the pin carrying said flange and a bolt head adjacent said first end of said bolt, said bolt head sized to preclude passage of said bolt head through said pin;
   a nut positioned on said threaded end of said bolt; and,
   a washer positioned between said bolt head and said pin, said washer engaging said inner flanged bushing located within said lug adjacent said bolt head, wherein upon application of torque to said bolt head and said nut, said inner flanged bushings located within each lug are compressed against said bearing thereby precluding application of force laterally against said lugs.

2. A bearing assembly configured for use with an aircraft engine comprising:
   a pair of lugs;
   a pair of nested bushings positioned within each lug, each nested bushing having an inner flanged bushing and an outer flanged bushing, said inner flanged bushing extending beyond said lug;
   a bearing positioned between said lugs such that said bearing is adjacent to the flanges of each nested bushing;
   a pin passing through said bearing, said pin having a first end and a second end,
   a bolt positioned within said pin, said bolt having a threaded end protruding from the second end of the pin carrying said flange and a bolt head adjacent said first end of said bolt, said bolt head sized to preclude passage of said bolt head through said pin;
   a nut positioned on said threaded end of said bolt;
   a first washer positioned between said nut and said pin, said first washer engaging said inner flanged bushing located within said lug adjacent said nut; and,
   a second washer positioned between said bolt head and said pin, said second washer engaging said inner flanged bushing located within said lug adjacent said bolt head, wherein upon application of torque to said bolt head and said nut, said inner flanged bushings located within each lug are compressed against said bearing thereby precluding application of force laterally against said lugs.

* * * * *